(12) United States Patent
Hiraiwa et al.

(10) Patent No.: US 10,543,805 B2
(45) Date of Patent: Jan. 28, 2020

(54) SIDE AIRBAG DEVICE

(71) Applicant: TOYODA GOSEI CO., LTD., Kiyosu-shi, Aichi-ken (JP)

(72) Inventors: Takuya Hiraiwa, Kiyosu (JP); Takashi Iida, Kiyosu (JP); Norio Mizuno, Kiyosu (JP); Jun Sato, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 94 days.

(21) Appl. No.: 15/992,299

(22) Filed: May 30, 2018

(65) Prior Publication Data

US 2018/0345900 A1  Dec. 6, 2018

(30) Foreign Application Priority Data

Jun. 5, 2017 (JP) .................................. 2017-110895

(51) Int. Cl.
*B60R 21/239* (2006.01)
*B60R 21/231* (2011.01)
*B60R 21/2338* (2011.01)
*B60R 21/00* (2006.01)

(52) U.S. Cl.
CPC ........ *B60R 21/239* (2013.01); *B60R 21/2338* (2013.01); *B60R 21/23138* (2013.01); *B60R 2021/0006* (2013.01); *B60R 2021/2395* (2013.01); *B60R 2021/23146* (2013.01); *B60R 2021/23382* (2013.01)

(58) Field of Classification Search
CPC ............ B60R 21/239; B60R 21/23138; B60R 21/2338; B60R 2021/23146; B60R 2021/23382; B60R 2021/2395
See application file for complete search history.

(56) References Cited

U.S. PATENT DOCUMENTS

| | | | | |
|---|---|---|---|---|
| 7,281,733 B2* | 10/2007 | Pieruch | ................. | B60R 21/213 |
| | | | | 280/728.2 |
| 7,475,904 B2* | 1/2009 | Hofmann | .......... | B60R 21/23138 |
| | | | | 280/730.2 |
| 8,579,324 B2* | 11/2013 | Kwon | ................... | B60R 21/233 |
| | | | | 280/729 |
| 2019/0118759 A1* | 4/2019 | Kobayashi | ........ | B60R 21/23138 |

FOREIGN PATENT DOCUMENTS

| | | | | |
|---|---|---|---|---|
| DE | 102008028389 A1 * | 12/2009 | ........... | B60R 21/233 |
| JP | 05186961 A * | 7/1993 | ......... | B60R 21/2338 |
| JP | 2001-114065 A | 4/2001 | | |

* cited by examiner

*Primary Examiner* — Faye M Fleming
(74) *Attorney, Agent, or Firm* — Posz Law Group, PLC

(57) ABSTRACT

A side airbag device includes: an airbag which is stored in a storage part provided on a side of an occupant sitting on a seat of a vehicle in a normal posture, and is deployed and inflated forward between the occupant and a side wall part by an inflation gas supplied from a gas generator in response to an impact applied from a side to the side wall part of the vehicle; an exhaust port configured to exhaust an inflation gas, the exhaust port being provided with the airbag and open toward a direction along a wall surface of the side wall part; and an opening varying mechanism configured to reduce an opening area of the exhaust port in a later stage of deployment and inflation of the airbag compared to an initial stage.

7 Claims, 14 Drawing Sheets

SIDE AIRBAG DEVICE

CROSS-REFERENCE TO RELATED APPLICATION(S)

This application is based upon and claims the benefit of priority from Japanese Patent Application No. 2017-110895, filed on Jun. 5, 2017, the entire contents of which are incorporated herein by reference.

BACKGROUND

1. Field of the Invention

The present invention relates to a side airbag device which protects an occupant from an impact in such a manner that an airbag is deployed and inflated between the occupant sitting on a seat and a side wall part in a case where the impact is applied to the side wall part of the vehicle.

2. Description of the Related Art

In a case where an impact is applied from a side against a side wall part of a vehicle due to a side collision or the like, a side airbag device including a gas generator and an airbag is effective as a device which protects an occupant sitting on a seat. The airbag is folded to be in a stored form and is stored together with the gas generator in a storage part provided in an outboard side part of a back rest part in the seat.

In the side airbag device, an inflation gas is supplied from the gas generator to the airbag in response to the impact, and the airbag starts to be deployed and inflated. The airbag protrudes from the seat in a state where a portion thereof remains in the storage part. Thereafter, in the airbag, a portion between the occupant and the side wall part is deployed and inflated forward to restrain the occupant. In addition, the airbag is interposed between the side wall part and the occupant, so that the impact applied to the occupant is alleviated, whereby the occupant is protected from the impact.

Incidentally, when the airbag is deployed and inflated forward from the storage part of the back rest part, there may be a child near the front side of the storage part. For example, the child may rest on the outboard side part of the back rest part. Under this situation, there is a concern that the airbag presses the child when the airbag is deployed and inflated due to the side collision or the like.

In this regard, for example, in JP-A-2001-114065, the side airbag device is described which is provided with a mechanism for lowering an internal pressure of an airbag in an initial stage of the deployment and inflation of the airbag compared to a later stage.

The side airbag device includes a sliding member (movable fabric) which slides in accordance with the deployment and inflation of the airbag. An exhaust port (vent hole) is opened in each of the airbag and the sliding member. Incidentally, in the description of JP-A-2001-114065, the name in parentheses following the name of the member is the name of the member used in JP-A-2001-114065.

In the side airbag device, in the initial stage of the deployment and inflation of the airbag, the sliding member is not slid, and the exhaust port of the same sliding member is overlapped with the exhaust port of the airbag. The opening area of the exhaust port of the airbag is large, and a large amount of inflation gas is exhausted therefrom, whereby the internal pressure of the airbag is lowered. For this reason, even when the child is near the front side of the storage part and the airbag interferes (abuts) with the child in the initial stage of the deployment and inflation, the inflation gas is continuously exhausted from the exhaust port without a strong pressure. The side airbag device completes an operation before the airbag is deployed and inflated completely.

In a case where the child is not near the front side of the storage part, the sliding member is stretched and slid in accordance with the deployment and inflation of the airbag. The overlapped amount of both exhaust ports is reduced in accordance with the sliding, and the opening area of the exhaust port of the airbag is smaller compared to the initial stage of the deployment and inflation. The exhaustion of the inflation gas from the exhaust port is suppressed so that the airbag is completely deployed and inflated quickly. The occupant sitting on the seat in a normal posture is restrained by the airbag and is protected from the impact.

Incidentally, in the side airbag device described in JP-A-2001-114065, the exhaust port of the airbag is open to face the side wall part. The side wall part is positioned on the front side in a direction in which the inflation gas is exhausted from the exhaust port. For this reason, the side wall part inhibits the exhaustion of the inflation gas from the exhaust port of the airbag. In the initial stage of the deployment and inflation of the airbag, although the opening area of the exhaust port of the airbag is large, the exhaustion of the inflation gas is obstructed by the side wall part, so that a performance that lowers the internal pressure cannot be exhibited sufficiently, which is a matter of concern.

SUMMARY

The invention has been made in consideration of the above situation, and an object thereof is to provide a side airbag device in which an exhaust performance of an inflation gas in an initial stage of deployment and inflation of an airbag can be improved.

According to a first aspect of the invention, there is provided a side airbag device including: an airbag which is stored in a storage part provided on a side of an occupant sitting on a seat of a vehicle in a normal posture, and is deployed and inflated forward between the occupant and a side wall part by an inflation gas supplied from a gas generator in response to an impact applied from a side to the side wall part of the vehicle; an exhaust port configured to exhaust an inflation gas, the exhaust port being provided with the airbag and open toward a direction along a wall surface of the side wall part; and an opening varying mechanism configured to reduce an opening area of the exhaust port in a later stage of deployment and inflation of the airbag compared to an initial stage.

With the above configuration, when the impact is applied from a side with respect to the side wall part of the vehicle by the side collision and the like, the inflation gas is supplied from the gas generator to the airbag in response to the impact, so that the airbag starts to be deployed and inflated. The airbag is deployed and inflated forward between the occupant and the side wall part, so as to restrain the occupant. In addition, the airbag is interposed between the side wall part and the occupant, so that the impact applied to the occupant is alleviated, whereby the occupant is protected from the impact.

When the airbag is deployed and inflated as described above, the opening area of the exhaust port is enlarged in the initial stage by the opening varying mechanism compared to the later stage. In the initial stage of the deployment and inflation, the more inflation gas is exhausted from the exhaust port compared to the later stage, and the internal pressure of the airbag is lowered compared to the same later stage. For this reason, even when a child is near the front side of the storage part, and the airbag interferes (abuts) with the child in the initial stage of the deployment and inflation, the inflation gas is continuously exhausted from the exhaust port without a strong pressure. The side airbag device completes an operation before the airbag is deployed and inflated completely.

In addition, in a case where the child is not near the front side of the storage part, after the state of the initial stage of the deployment and inflation of the airbag, that is, the state where the opening area of the exhaust port is large, the opening area of the exhaust port is reduced compared to the initial stage by the opening varying mechanism. The exhaustion of the inflation gas from the exhaust port is suppressed so that the airbag is completely deployed and inflated quickly. The occupant sitting on the seat in a normal posture is restrained by the airbag and is protected from the impact.

Incidentally, the exhaust port is open toward the direction along the wall surface of the side wall part. For this reason, the inflation gas exhausted from the exhaust port flows in the direction along the wall surface of the side wall part. Differently from a case where the side wall part is positioned on the front side in the exhaust direction of the inflation gas from the exhaust port, the exhaustion of the inflation gas from the exhaust port is hardly inhibited by the side wall part. In the initial stage of the deployment and inflation of the airbag, a performance is exhibited which lowers the internal pressure of the airbag by exhausting the inflation gas from the exhaust port. In this manner, the exhaust performance of the inflation gas in the initial stage of the deployment and inflation of the airbag is improved.

According to a second aspect of the invention, in the side airbag device according to the first aspect, the opening varying mechanism includes: a pair of sheet parts which extend from the airbag and oppositely disposed by interposing the exhaust port; and a long belt-shaped tether in which a main portion is arranged in the airbag, one sheet part is formed by a belt-shaped short sheet part, and the other sheet part is formed by a long sheet part which extends from the airbag further than the short sheet part, the long sheet part includes: a belt-shaped facing sheet part which is arranged on an opposite side to the short sheet part across the exhaust port; a belt-shaped intermediate sheet part which is overlapped on an opposite side to the exhaust port with respect to the facing sheet part; and a belt-shaped terminal sheet part which is overlapped on an opposite side to the facing sheet part with respect to the intermediate sheet part, the short sheet part and the long sheet part are coupled in places facing each other by interposing the exhaust port in a direction along a surface of the short sheet part, one end portion of the tether is coupled with the airbag, and the other end portion is arranged in an outer portion of the airbag through the exhaust port to be coupled with an end portion of the terminal sheet part on a side apart from the intermediate sheet part, and in the opening varying mechanism, the tether is loosened in the initial stage of the deployment and inflation of the airbag so that the short sheet part and the facing sheet part are separable from each other, the tether is tensioned in the later stage so that the long sheet part in the terminal sheet part is stretched to the exhaust port side, and the intermediate sheet part and the terminal sheet part turn to an opposite side to the exhaust port by interposing the short sheet part when the inflation gas exhausted through the exhaust port enters into a space between the intermediate sheet part and the terminal sheet part.

With the above configuration, in the initial stage of the deployment and inflation of the airbag, the tether is loosened so that the short sheet part and the facing sheet part are separable from each other. For this reason, the inflation gas in the airbag is exhausted from the exhaust port to the outer portion of the airbag through the short sheet part and the facing sheet part which are separated.

Herein, in the side airbag device described in JP-A-2001-114065, from the initial stage of the deployment and inflation of the airbag, the sliding member is positioned to be close to the exhaust port of the same airbag, so as to inhibit the exhaustion of the inflation gas from the exhaust port, which is a matter of concern.

At this point, with the above configuration, an additional member which inhibits the exhaustion of the inflation gas is not arranged near the exhaust port. For this reason, the more inflation gas than in JP-A-2001-114065 can be exhausted from the exhaust port to the outer portion of the airbag.

The tether is tensioned in the later stage of the deployment and inflation of the airbag. In the terminal sheet part, the long sheet part is stretched to the exhaust port side by the tether. The stretched terminal sheet part enters into a space between the short sheet part and the facing sheet part. However, the short sheet part and the long sheet part are coupled in the places facing each other with the exhaust port interposed therebetween in the direction along the surface of the short sheet part. Thus, a portion of the inflation gas exhausted through the exhaust port enters into a space between the terminal sheet part stretched by the tether as above and the intermediate sheet part. The intermediate sheet part receives the pressure of the inflation gas. The intermediate sheet part and the terminal sheet part are rotated about the vicinity of the boundary portion of the facing sheet part and the intermediate sheet part, and are turned (inverted) to the opposite side to the exhaust port with the short sheet part interposed therebetween.

By the inverting, the facing sheet part is positioned on the opposite side to the short sheet part with the exhaust port interposed therebetween. The intermediate sheet part is positioned on the downstream side between the short sheet part and the facing sheet part in the exhaust direction. The terminal sheet part is positioned on the opposite side to the exhaust port of the short sheet part. The exhaust port becomes in a closed state by the intermediate sheet part and the terminal sheet part.

According to a third aspect of the invention, in the side airbag device according to the second aspect, a length of the tether is set to be a length that the tether stretches the terminal sheet part such that, when the same tether is tensioned in the later stage of the deployment and inflation of the airbag, the terminal sheet part is capable of being brought into pressure contact with a surface opposite to the exhaust port in the short sheet part.

With the above configuration, after the tether is tensioned in the later stage of the deployment and inflation of the airbag, and the intermediate sheet part and the terminal sheet part are turned (inverted) to the opposite side to the exhaust port of the short sheet part, the terminal sheet part is brought into pressure contact with the opposite surface to the exhaust port in the short sheet part. By the pressure contact, a gap between the short sheet part and the terminal sheet part becomes small, and the inflation gas is hardly exhausted to the outer portion of the airbag.

According to a fourth aspect of the invention, in the side airbag device according to the third aspect, the opening varying mechanism includes: a pair of sheet parts which extend from the airbag and oppositely disposed by interposing the exhaust port; and a long belt-shaped tether in which a main portion is arranged in the airbag, one sheet part is formed by a belt-shaped short sheet part, and the other sheet part is formed by a long sheet part which extends from the airbag further than the short sheet part, the long sheet part includes: a belt-shaped facing sheet part which is arranged on an opposite side to the short sheet part across the exhaust port, a belt-shaped intermediate sheet part which is overlapped on an opposite side to the exhaust port with respect to the facing sheet part, and a belt-shaped terminal sheet part which is overlapped on an opposite side to the facing sheet part with respect to the intermediate sheet part, the short sheet part and the long sheet part are coupled in places facing each other by interposing the exhaust port in a direction along a surface of the short sheet part, one end portion of the tether is coupled with the airbag, and the other end portion is arranged in an outer portion of the airbag through the exhaust port to be coupled with an end portion of the terminal sheet part on a side apart from the intermediate sheet part, and in the opening varying mechanism, the tether is loosened in the initial stage of the deployment and inflation of the airbag so that the short sheet part and the facing sheet part are separable from each other, the tether is tensioned in the later stage so that the long sheet part in the terminal sheet part is stretched to the exhaust port side, and the intermediate sheet part and the terminal sheet part turn to an opposite side to the exhaust port by interposing the short sheet part when the inflation gas exhausted through the exhaust port enters into a space between the intermediate sheet part and the terminal sheet part.

With the above configuration, in the later stage of the deployment and inflation of the airbag, when the main tether is tensioned, and the intermediate sheet part and the terminal sheet part are turn (inverted) to the opposite side to the exhaust port of the short sheet part, the auxiliary tether stretches the short sheet part to the exhaust port side so as to regulate the short sheet part not to be inflated such that the tip portion of the short sheet part is apart from the exhaust port. For this reason, the intermediate sheet part and the terminal sheet part can be properly turned (inverted) to the opposite side to the exhaust port of the short sheet part.

According to a fifth aspect of the invention, in the side airbag device according to any one of the first to fourth aspect, the exhaust port is open toward an obliquely rear lower side.

With the above configuration, the exhaust port of the airbag is open toward the obliquely rear lower side which is one direction along the wall surface of the side wall part. For this reason, the inflation gas exhausted from the exhaust port flows toward the obliquely rear lower side along the wall surface of the side wall part.

In a case where the child is near the front side of the storage part, the direction of the exhaustion of the inflation gas from the exhaust port is a direction apart from the child. For this reason, even when the airbag interferes (abuts) with the child in the initial stage of the deployment and inflation, the exhaustion of the inflation gas from the exhaust port is hardly inhibited by the child. In the initial stage of the deployment and inflation of the airbag, a performance is properly exhibited which lowers the internal pressure of the airbag by exhausting the inflation gas from the exhaust port.

According to a sixth aspect of the invention, in the side airbag device according to the fifth aspect, the exhaust port is arranged on a rear side from a front end edge of a side support part forming an outboard side part in a back rest part of the seat.

With the above configuration, when the airbag starts to be deployed and inflated, the inflation gas is exhausted from the exhaust port on the rear side from the front end edge of the side support part. On the other hand, the child is positioned on the front side from a front end edge of the side support part. Accordingly, the inflation gas starts to be exhausted from the exhaust port before the airbag interferes (abuts) with the child. The airbag of which the internal pressure is lowered by the exhaustion interferes (abuts) with the child, and thus it can be further suppressed that the child is pressed strongly.

According to a seventh aspect of the invention, in the side airbag device according to any one of the first to sixth aspect, the exhaust port also serves as an insertion port for inserting the gas generator in the airbag.

Herein, if the insertion port for inserting the gas generator in the airbag is provided separately from the exhaust port, a seal structure is necessary which suppresses that the inflation gas from the insertion port leaks out to the outer portion of the airbag after the gas generator is inserted into the airbag through the insertion port.

At this point, with the above configuration, the gas generator can be inserted into the airbag through the exhaust port. The opening area of the exhaust port is adjusted by the opening varying mechanism. For this reason, the seal structure is not necessary which suppresses that the inflation gas from the exhaust port also serving as the insertion port leaks out to the outer portion of the airbag.

According to the side airbag device, it is possible to improve the exhaust performance of the inflation gas in the initial stage of the deployment and inflation of the airbag.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, one specified embodiment of a front-seat side airbag device of a vehicle will be described with reference to FIGS. 1 to 14. Incidentally, in the following description, an advancing direction of the vehicle is described as a front side, and a retreating direction of the vehicle is described as a rear side. In addition, with a central portion in a vehicle width direction of the vehicle as a reference, a side close to the central portion is set as an "inboard side", and a side far from the central portion is set as an "outboard side". In addition, the occupant having a physique similar to a crash test dummy sits on the seat.

Figure 1:
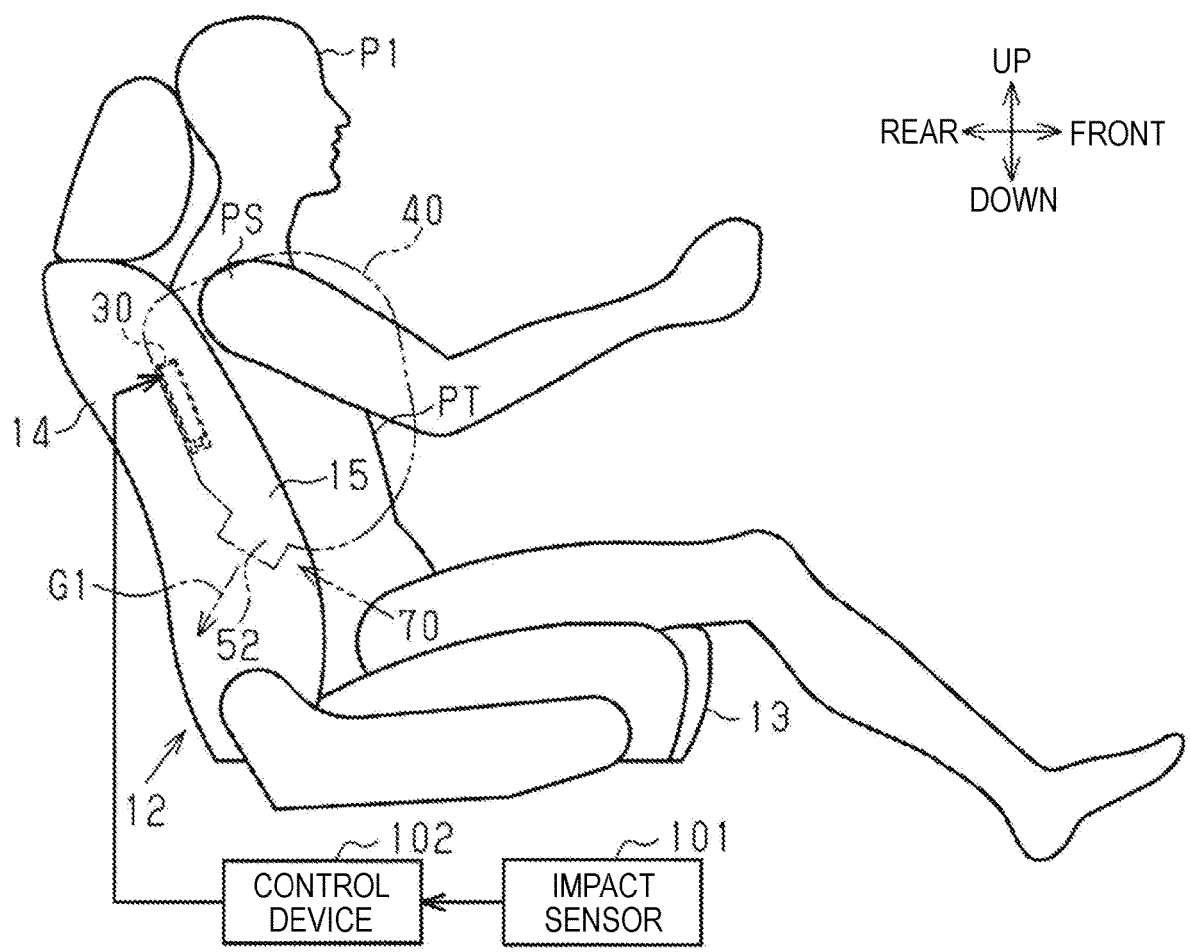
FIG. 1 is a side view illustrating a seat provided with a side airbag device in one embodiment together with an occupant.
Figure 2:
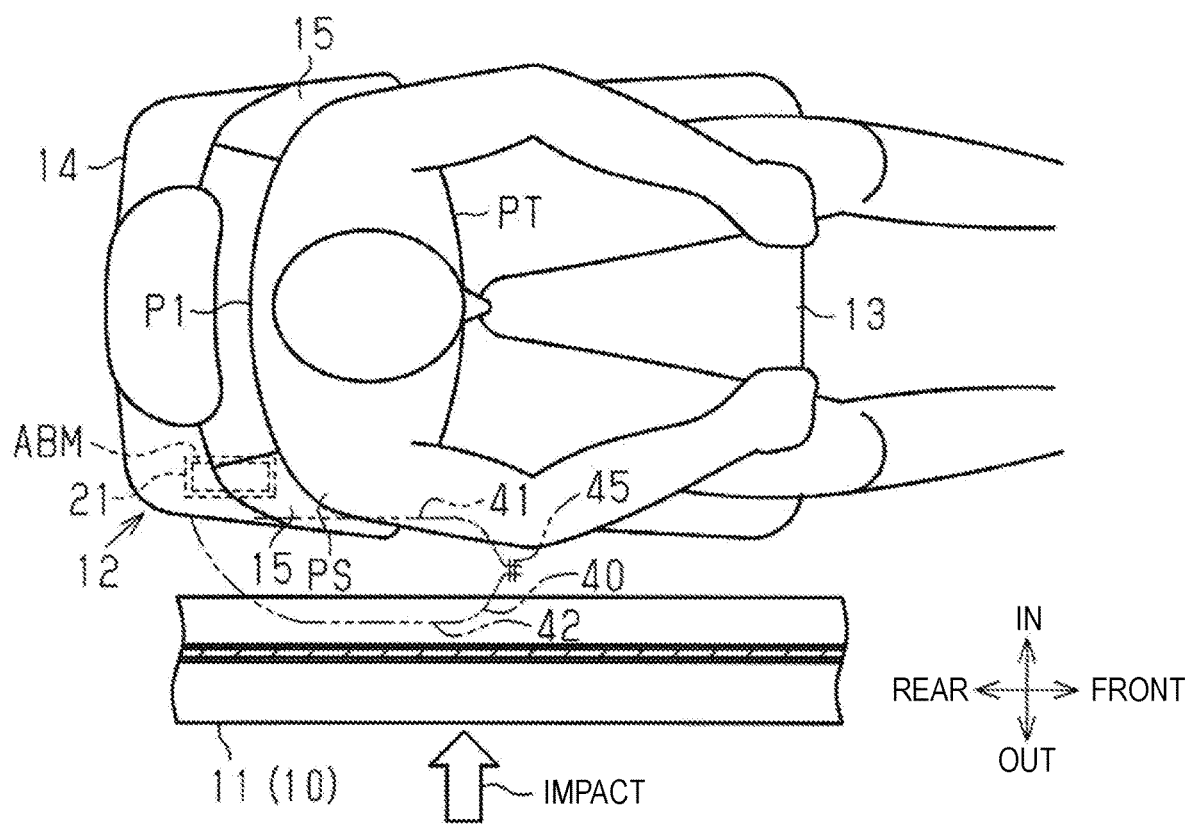
FIG. 2 is a plan view illustrating a positional relation among a seat, an airbag, the occupant, and a side wall part in one embodiment.

As illustrated in FIGS. 1 and 2, a seat 12 is arranged as a front seat near an inboard side of a side wall part 11 in a vehicle 10. Herein, the side wall part 11 indicates a vehicle component arranged in the side part of the vehicle 10. A door, a pillar, or the like mainly correspond thereto. The side wall part 11 corresponding to the front seat is a front door, a center pillar (B pillar), or the like.

The seat 12 includes a seat part 13 and a back rest part 14. The seat part 13 is attached in a floor of a vehicle body such that the position thereof is adjustable in a front and rear direction. The back rest part 14 is erected to be inclined to the rear side upward from the rear portion of the seat part 13, and is formed such that the inclination angle is adjustable.

The back rest part 14 includes a pair of side support parts 15 in both side parts on the outboard side and the inboard side in the vehicle width direction. The both side support parts 15 protrudes much to the front side compared to other places of the back rest part 14, and regulates a movement of an upper body of an occupant P1 which sits on the seat part 13 and rests on the back rest part 14 in the vehicle width direction.

Figure 3B:
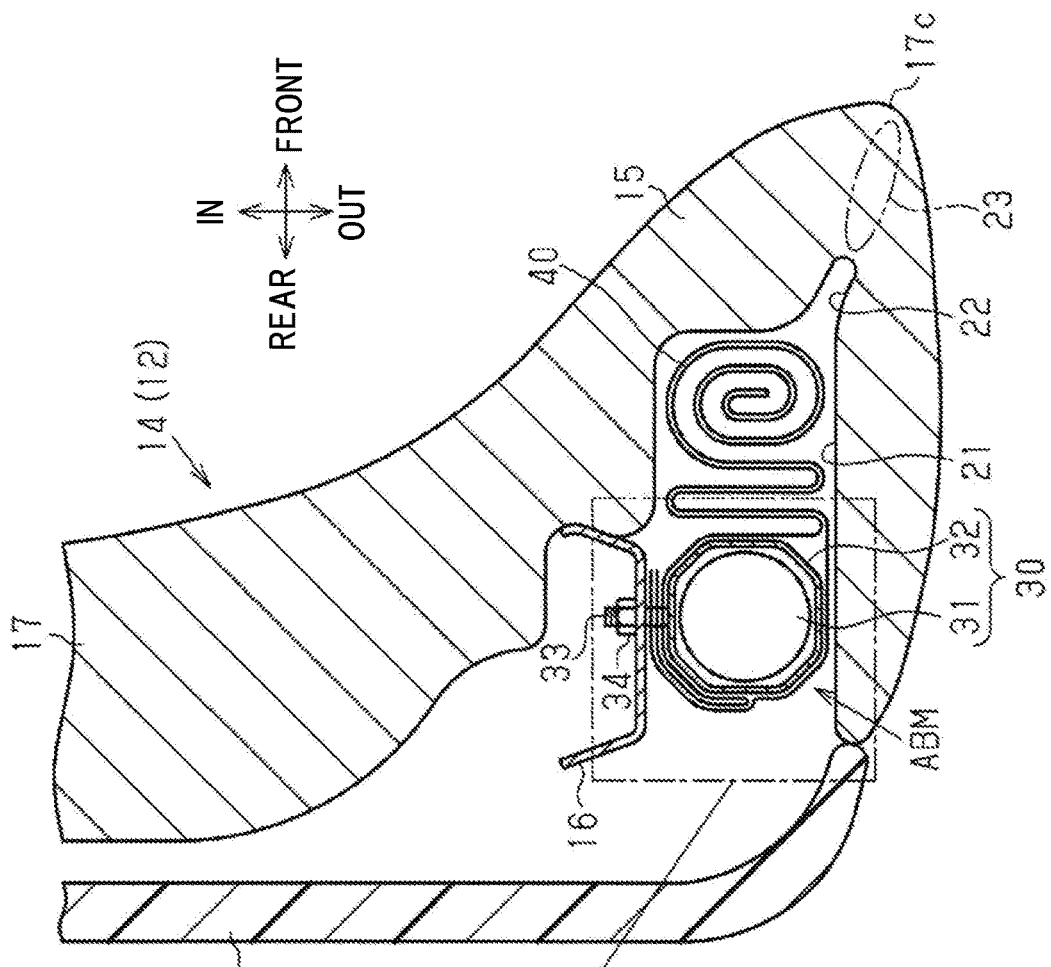
FIG. 3B is a partial cross-sectional plan view enlargedly illustrating a part of FIG. 3A.
Figure 3A:
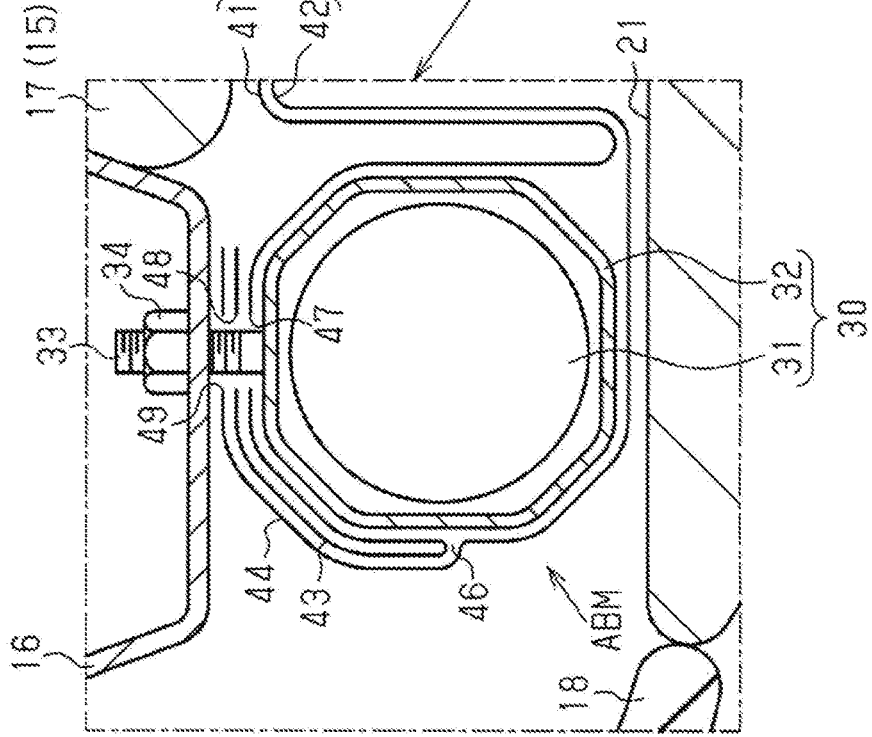
FIG. 3A is a partial cross-sectional plan view illustrating an internal structure of an outboard side part in a back rest part in which an airbag module is embedded in one embodiment.

Next, the description will be given about an internal structure of an outboard side part in the back rest part 14. A frame forming a skeleton thereof is arranged inside the back rest part 14. As illustrated in FIG. 3A, a portion of the frame is arranged inside the outboard side part in the back rest part 14, and the portion (hereinafter, referred to as a "side frame part 16") is formed through a bending process or the like of a metal plate. A pad 17 made of an elastic material such as urethane foam is arranged on the front side of the frame including the side frame part 16. In addition, a back board 18 formed of synthetic resin or the like is arranged on the rear side of the frame. Incidentally, the pad 17 is covered with a skin, but the skin is not illustrated in FIG. 3A.

In the pad 17, the storage part 21 is provided in the place adjacent to the outboard side of the side frame part 16. The storage part 21 is positioned on the side of the occupant P1 sitting on the seat 12 in a normal posture. An airbag module ABM forming the main portion of the side airbag device is embedded in the storage part 21.

A slit 22 extends to obliquely front and outboard side from the corner parts of the storage part 21 on the front side and the outboard side. The place (a place surrounded by a frame of a two-dot chain line in FIG. 3A) which is held by the corner part 17c on the front side of the outboard side part of the pad 17 and the slit 22 forms a breakage expected portion 23 to be broken by an airbag 40 (to be described).

The airbag module ABM includes a gas generator 30 and the airbag 40 as main components. Next, the description will be given about each of the components. Herein, in this embodiment, in the airbag module ABM and the components thereof, a "vertical direction" and a "front and rear direction" are set with the back rest part 14 of the seat 12 as a reference. A direction in which the back rest part 14 is erected is set as a "vertical direction" of the airbag module ABM or the like, and a thickness direction of the back rest part 14 is set as a "front and rear direction" of the airbag module ABM or the like. As described above, since the back rest part 14 is inclined slightly to the rear side, the "vertical direction" of the airbag module ABM or the like does not strictly match with the vertical direction (perpendicular direction) of the vehicle 10, and is inclined slightly. Similarly, the "front and rear direction" of the airbag module ABM or the like does not match with the front and rear direction (horizontal direction) of the vehicle 10, and is inclined slightly.

Figure 5:
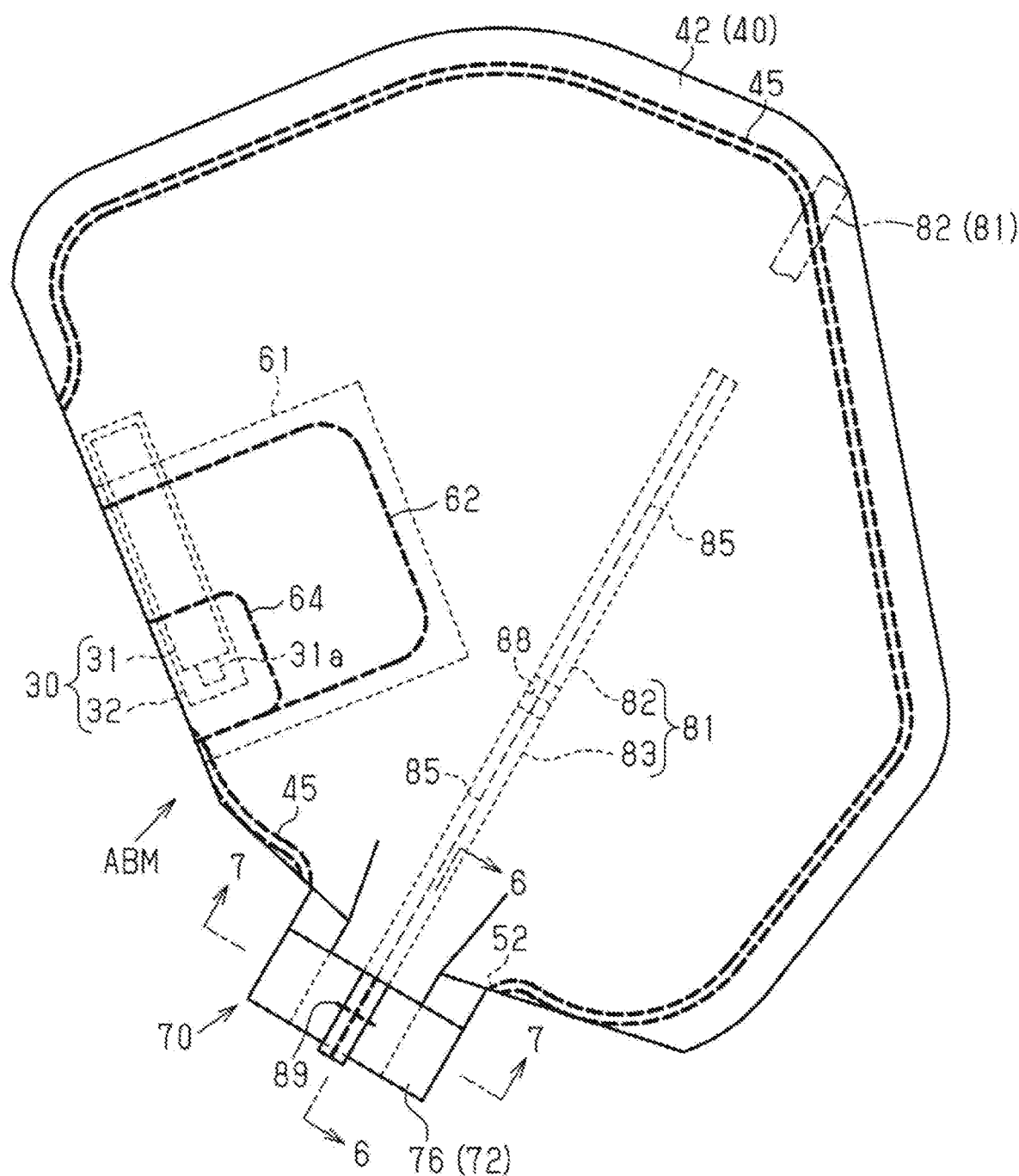
FIG. 5 is a side view illustrating an airbag module in which the airbag is deployed and is not inflated in one embodiment when viewed from an outboard side.
Figure 5:
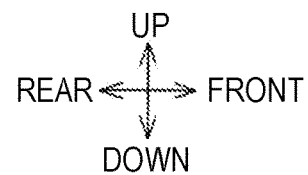

As illustrated in FIGS. 3A and 5, the gas generator 30 includes an inflator 31 and a retainer 32 which covers the inflator 31, and is formed overall in a long shape. Herein, a type called a pyro type is adopted as the inflator 31. The inflator 31 is formed in a substantially columnar shape, and a gas generating agent (not illustrated) which generates an inflation gas is contained therein. The inflator 31 has a gas injection part 31a in the lower end portion thereof. In addition, a harness which serves as an input wire of an operation signal to the same inflator 31 is connected in the upper end portion of the inflator 31 through the connector (both are not illustrated).

Incidentally, as the inflator 31, instead of the pyro type using the gas generating agent, a type (hybrid type) may be used in which a partition wall of a high pressure gas cylinder filled with a high pressure gas is broken by gunpowder or the like so as to inject the inflation gas.

On the other hand, the retainer 32 functions as a diffuser which controls a direction of injecting an inflation gas, and is a member which has a function to attach the inflator 31 in the side frame part 16 together with the airbag 40 or the like. The most portion of the retainer 32 is formed in a substantially cylindrical shape through the bending process or the like of a plate material such as a metal plate. In a plurality of places which are separated from each other in the vertical direction of the retainer 32, a bolt 33 is fixed as a member for attaching the retainer 32 in the side frame part 16.

Incidentally, the gas generator 30 may be formed such that the inflator 31 is integral with the retainer 32. In addition, the gas generator 30 may be formed only by the inflator 31 having the bolt 33 without using the retainer 32.

FIG. 5 illustrates the airbag module ABM in a state where the airbag 40 is deployed and is not inflated. Hereinafter, the state of the airbag 40 is referred to as a "deployment and non-inflation state". In addition, FIG. 4 illustrates a state where the components or the like of the airbag 40 is exploded and deployed in a planar shape.

Figure 4:
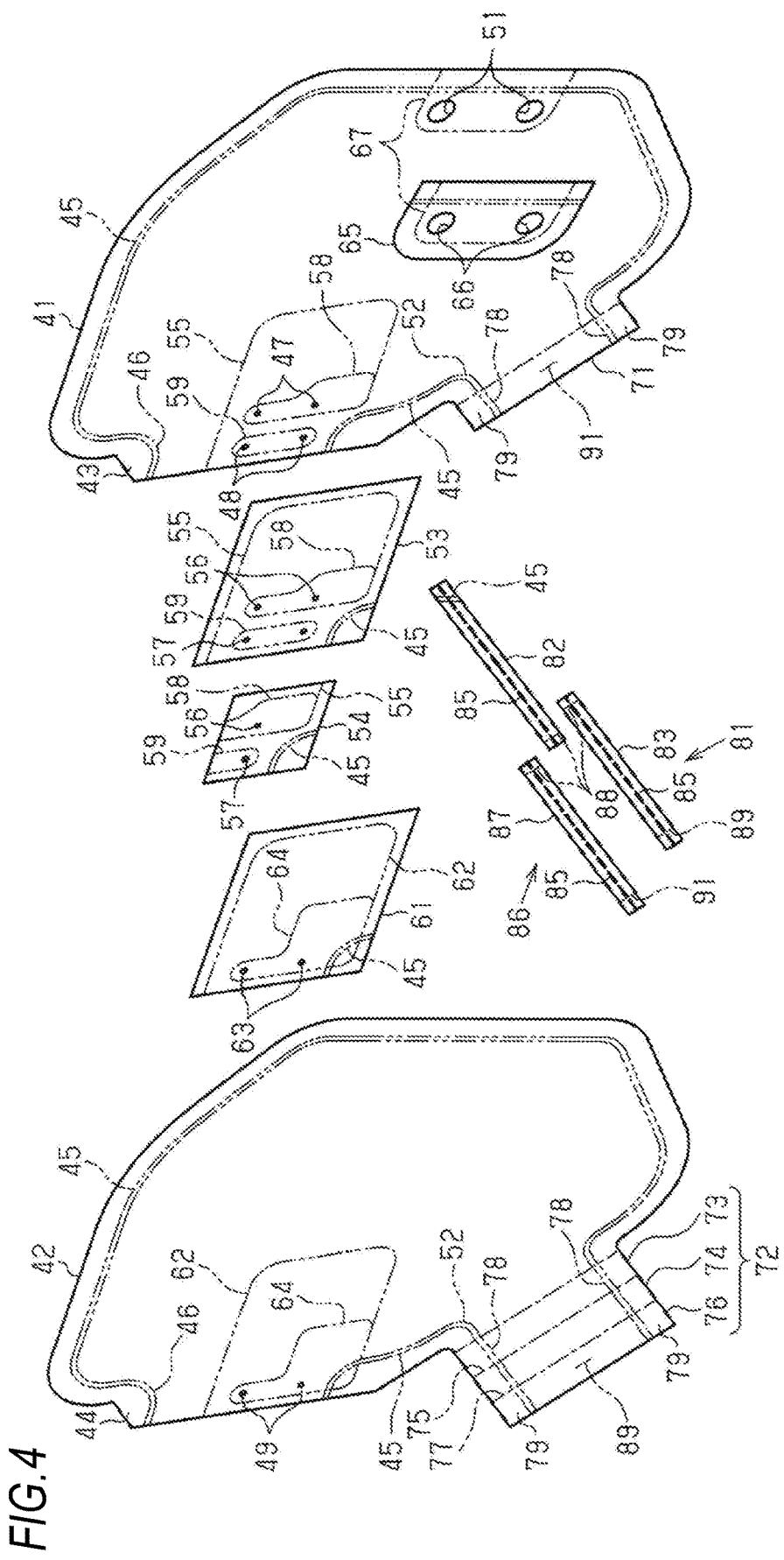
FIG. 4 is an exploded perspective view illustrating a state where a fabric part, reinforcing fabric, a main tether, an auxiliary tether, and the like of the airbag are deployed in one embodiment.

As illustrated in FIGS. 4 and 5, the airbag 40 is formed of two fabric pieces (referred to as basic fabric and panel fabric) which are separated from each other. The airbag 40 is formed in such a manner that both fabric pieces are overlapped in the vehicle width direction and are coupled to form a bag shape. Herein, in order to distinguish both fabric pieces, the fabric piece positioned on the inboard side is referred to as a fabric part 41, and the fabric piece positioned on the outboard side is referred to as a fabric part 42.

A flap part 43 protruding to the rear side is integrally formed in the rear end portion of the inboard-side fabric part 41. The flap part 44 protruding to the rear side is integrally formed in the rear end portion of the outboard-side fabric part 42.

As illustrated in FIGS. 1 and 2, when the airbag 40 is completely deployed and inflated, the shape and the size of the both fabric parts 41 and 42 are formed such that the both fabric parts are positioned on the side of the area from at least a portion (in this embodiment, a shoulder part PS) of the upper body of the occupant P1 toward a breast part PT.

Woven fabric or the like formed by using a sheet material (for example, a polyester yarn and a polyamide yarn) which is excellent in a strength and is easily folded because of a flexibility is proper as the both fabric parts 41 and 42.

As illustrated in FIGS. 4 and 5, the coupling of the both fabric parts 41 and 42 is performed in a circumferential coupling part 45 provided in the most circumferential portion thereof. The most portion indicates a place obtained by excluding a most portion of the flap parts 43 and 44 forming the rear end portion and the rear lower end portion from the circumferential portion of the both fabric parts 41 and 42. The circumferential coupling part 45 is divided in the both flap parts 43 and 44 to extend toward the rear side almost in parallel to each other in the upper end portion and the lower end portion of the same flap parts 43 and 44. The circumferential coupling part 45 is divided in the rear end portion of the circumferential portion of the both fabric parts 41 and 42, so as to extend toward an obliquely rear lower side almost in parallel to each other in the rear upper end portion and the front lower end portion of the same rear end portion.

The circumferential coupling part 45 is formed by stitching (sewing) the place of the circumferential portion of the both fabric parts 41 and 42 with a suture. The coupling by sewing as described above is similarly applied to various coupling parts (to be described). The various coupling parts indicate coupling parts 55, 62, 67, 78, 85, 88, 89, and 91, and annular coupling parts 58, 59, and 64.

As for the sewing, a sewing portion is expressed by two line types in FIGS. 4, 5, and 8 to 10. The same is similarly applied to FIG. 15 used to describe a modification. A first line type is lines which are expressed by intermittently placing thick lines having a certain length side by side, and indicates the state of the suture when viewed from the side (see the circumferential coupling part 45 or the like in FIG. 5). A second line type is lines which are expressed by intermittently placing thin lines having a certain length (a length longer than a general broken line) side by side, and indicates the state of the suture when the suture is positioned, for example, in the inside of the fabric piece not to be seen directly (hidden) (see the coupling parts 85 and 88 in FIG. 5).

The circumferential coupling part 45 may be formed by adhesion using a unit such as an adhesive differently from the stitching with the suture. This point is similarly applied to the various coupling parts. Incidentally, the airbag 40 may be formed of one fabric piece. In the case, a fold line is set in the central portion of the fabric piece in the vehicle width direction, and the fabric piece is folded along the fold line into two to be overlapped in the vehicle width direction. The airbag 40 is formed when the overlapped portion is coupled in the bag shape by the circumferential coupling part.

Figure 10:
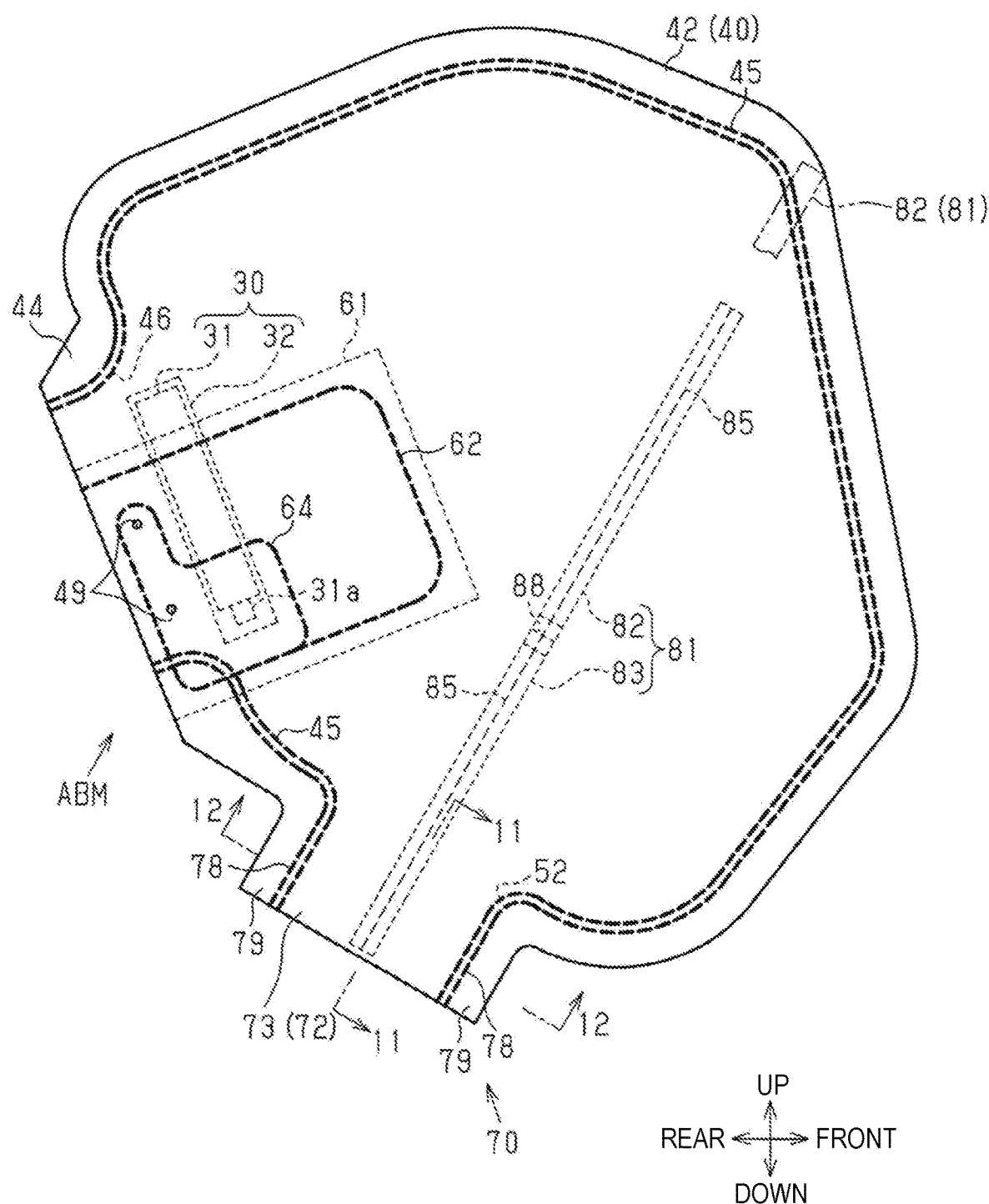
FIG. 10 is a side view illustrating the airbag module during manufacturing in one embodiment when viewed from the outboard side.

In the airbag 40 in which the both fabric parts 41 and 42 are coupled by the circumferential coupling part 45, the place surrounded by the circumferential coupling part 45 serves as an inflation part which is inflated by an inflation gas. As illustrated in FIGS. 3B and 10, between the base end parts (the boundary portion of the fabric parts 41 and 42 and the residue) of the both flap parts 43 and 44, the place which is not coupled by the circumferential coupling part 45 forms an insertion port 46. The insertion port 46 is used when the gas generator 30 is inserted into the airbag 40, or the harness connected with the inserted gas generator 30 is drawn to the outside of the airbag 40.

As illustrated in FIG. 4, in the fabric part 41 on the inboard side, in the vicinity of the front side of the flap part 43, bolt holes 47 for inserting the corresponding bolt 33 of the gas generator 30 are open in a plurality of places which are separated from each other in the vertical direction.

In the flap part 43, an engagement hole 48 for engaging the same flap part 43 in the bolt 33 inserted into the bolt hole 47 is open in each of a plurality of places which are on the rear side of the bolt hole 47. In a state where the both flap parts 43 and 44 are overlapped in the vehicle width direction, the engagement hole 49 is open in each of a plurality of places matching with the engagement holes 48 of the inboard-side flap part 43 in the outboard-side flap part 44. The engagement holes 48 and 49 have a function to hold the both flap parts 43 and 44 to be covered with the rear end portion of the airbag 40 such that the insertion port 46 is blocked.

Figure 9:
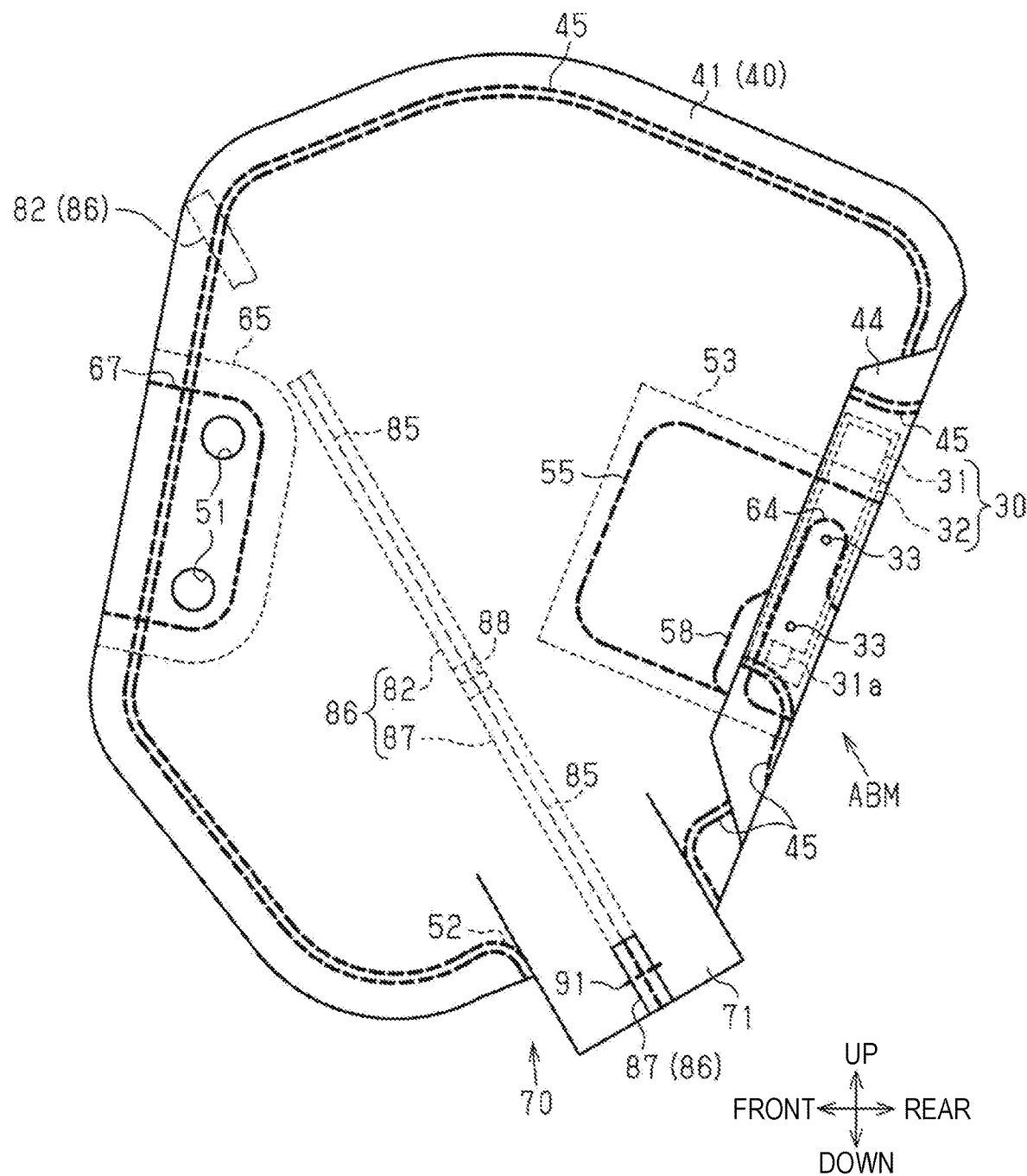
FIG. 9 is a side view illustrating the airbag module in which the airbag is deployed and is not inflated in one embodiment when viewed from an inboard side.

As illustrated in FIGS. 4 and 9, in the inboard-side fabric part 41, in the place (in this embodiment, the front end portion) far from the gas generator 30 to the front side, a vent hole 51 is open as one of communicate parts which communicate the inner portion of the airbag 40 with the outer portion. The vent hole 51 is used to discharge an excessive inflation gas in the airbag 40 completely deployed and inflated, and is provided in a plurality of places separated from each other in the vertical direction.

The place, which is not coupled by the circumferential coupling part 45, of the rear lower end portion of the both fabric parts 41 and 42 forms an exhaust port 52 for exhausting the inflation gas in the airbag 40. Similarly to the vent hole 51, the exhaust port 52 is also provided as one of the communicate parts which communicate the inner portion of the airbag 40 with the outer portion. The exhaust port 52 is open toward the obliquely rear lower side which is one direction along the wall surface of the side wall part 11. In the airbag 40, the place where the exhaust port 52 is provided is on the rear side from the front end edge of the side support part 15 on the outboard side (see FIG. 1).

A plurality of reinforcing fabrics 53, 54, 61, and 65 which are formed by a sheet material similarly to the fabric parts 41 and 42 are arranged in the airbag 40.

The reinforcing fabrics 53, 54, and 61 are arranged between the rear portions of the both fabric parts 41 and 42 in the state of being overlapped in the vehicle width direction. The rear lower portion of the reinforcing fabrics 53, 54, and 61 is sewn together in rear end portions of the both fabric parts 41 and 42 by a portion of the above-described circumferential coupling part 45.

The reinforcing fabrics 53 and 54 are coupled with the inboard-side fabric part 41 by the coupling part 55. In the reinforcing fabrics 53 and 54, the bolt hole 56 is open in the place corresponding to the bolt hole 47 of the inboard-side fabric part 41. In addition, in the reinforcing fabrics 53 and 54, the engagement hole 57 is open in the place corresponding to the engagement hole 48 of the flap part 43 on the inboard side.

The inboard-side fabric part 41 and the reinforcing fabrics 53 and 54 are coupled with each other by an annular coupling part 58 provided to surround all the bolt holes 47 and 56, and the periphery of the bolt holes 47 and 56 is reinforced by the annular coupling part 58. In addition, the inboard-side fabric part 41 and the reinforcing fabrics 53 and 54 are coupled with each other by an annular coupling part 59 provided to surround all the engagement holes 48 and 57, and the periphery of the engagement holes 48 and 57 is reinforced by the annular coupling part 59.

Similarly, the reinforcing fabric 61 is coupled with the outboard-side fabric part 42 by a coupling part 62. In the reinforcing fabric 61, the engagement hole 63 is open in the place corresponding to the engagement hole 49 of the outboard-side flap part 44.

The fabric part 42 of the outboard side and the reinforcing fabric 61 are coupled with each other by an annular coupling part 64 provided to surround all the engagement holes 49 and 63, and the periphery of the engagement holes 49 and 63 is reinforced by the annular coupling part 64.

The reinforcing fabric 65 has vent holes 66 in a plurality of places which are separated from each other in the vertical direction. The reinforcing fabric 65 is arranged between the front portions of the both fabric parts 41 and 42 in a state where the vent hole 66 thereof matches with the vent hole 51 of the inboard-side fabric part 41. The reinforcing fabric 65 is coupled with the fabric part 41 on the inboard side by the coupling part 67 provided in the circumferential portion thereof. The front portion of the reinforcing fabric 65 is sewn with both front end portions of the both fabric parts 41 and 42 by a portion of the above-described circumferential coupling part 45. All the vent holes 51 and 66 are surrounded by the coupling part 67 and the circumferential coupling part 45, and the periphery of the vent holes 51 and 66 is reinforced by the coupling part 67 and the circumferential coupling part 45.

As illustrated in FIGS. 3B and 4, the gas generator 30 having a posture to extend in the vertical direction is inserted from the insertion port 46 into the airbag 40. Between the both fabric parts 41 and 42, the gas generator 30 is arranged between the reinforcing fabrics 53 and 54 and the reinforcing fabric 61. The plurality of the bolts 33 in the gas generator 30 are inserted to the reinforcing fabrics 53 and 54 in the corresponding bolt holes 56 and 47 and the inboard-side fabric part 41. By the inserting, the gas generator 30 is engaged to be positioned with respect to the airbag 40 and the reinforcing fabrics 53 and 54. Incidentally, in FIGS. 3A and 3B, the reinforcing fabrics 53, 54, and 61 are not illustrated.

The flap parts 43 and 44 of the both fabric parts 41 and 42 are folded back to the inboard side in the base end part thereof and are covered with the rear end portion of the airbag 40. Further, the corresponding bolt 33 is inserted into the engagement holes 48 and 49 of the both flap parts 43 and 44 and the engagement holes 57 and 63 of the reinforcing fabrics 53, 54, and 61. By the inserting, the both flap parts 43 and 44 are engaged in the bolt 33. By the engaging, the insertion port 46 in the airbag 40 is closed, and the both flap parts 43 and 44 are held to be covered with the rear end portion of the residue of the airbag 40.

In addition, although not illustrated, the harness is drawn to the outer portion of the airbag 40 through the insertion port 46. The airbag 40, the reinforcing fabrics 53, 54, and 61, and the gas generator 30 are attached in the side frame part 16 in the bolt 33. The detailed description will be given below.

As illustrated in FIGS. 4, 5, and 9, an opening varying mechanism 70 is provided in the airbag 40. The opening varying mechanism 70 is a mechanism for adjusting the same opening area such that the opening area of the exhaust port 52 is small in the later stage of the deployment and inflation of the airbag 40 compared to the initial stage.

The opening varying mechanism 70 includes a pair of sheet parts which extend from the airbag 40 to face each other with the exhaust port 52 interposed therebetween in the vehicle width direction, and a long belt-shaped tether in which the main portion is arranged in the airbag 40.

One sheet part is formed by a belt-shaped short sheet part 71 which extends to the obliquely rear lower side from the rear lower end portion of the fabric part 41 on the inboard side. The other sheet part is formed by a long sheet part 72 which extends from the rear lower end portion of the outboard-side fabric part 42 to the obliquely rear lower side further than the short sheet part 71. Herein, a dimension in a direction to extend from the fabric parts 41 and 42 of the short sheet part 71 and the long sheet part 72 is set as a "length", and a dimension in a direction which is along the surface of the short sheet part 71 and is orthogonal to the extending direction of the short sheet part 71 and the long sheet part 72 is set as a "width". The long sheet part 72 has a width similar to or approximate to the short sheet part 71, and is about three times as long as the short sheet part 71.

Figure 6:
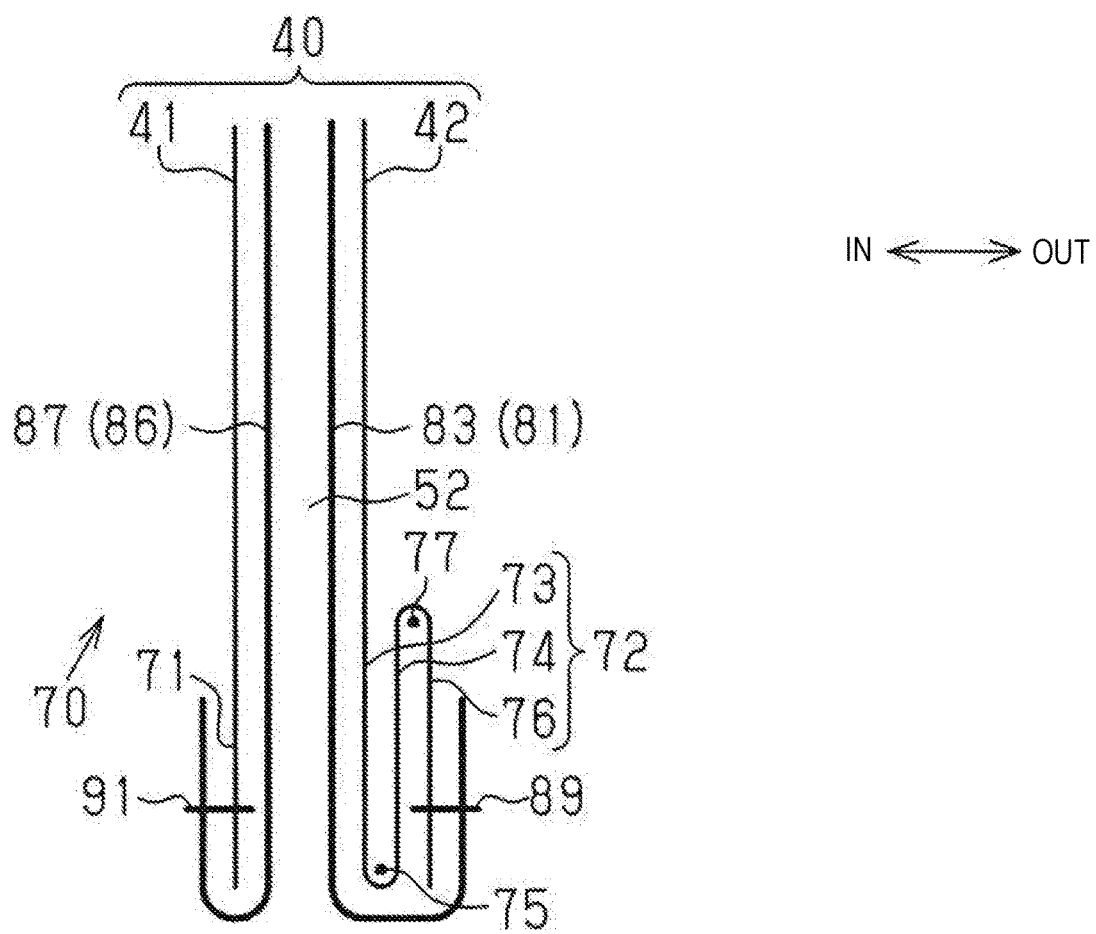
FIG. 6 is a sectional view taken along line 6-6 of FIG. 5.
Figure 7:
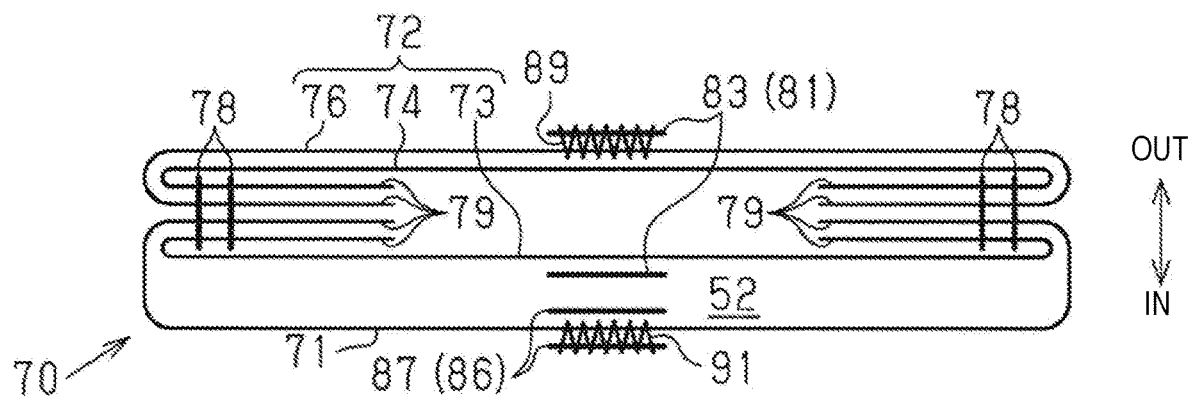
FIG. 7 is a sectional view taken along line 7-7 of FIG. 5.

As illustrated in FIGS. 4, 6, and 7, the long sheet part 72 includes a facing sheet part 73, an intermediate sheet part 74, and a terminal sheet part 76 in order to a side apart from the exhaust port 52 in a direction toward the obliquely rear lower side. The facing sheet part 73, the intermediate sheet part 74, and the terminal sheet part 76 are formed in a belt shape which is elongate in a width direction compared to in a length direction. In this embodiment, respective widths and respective lengths of the facing sheet part 73, the intermediate sheet part 74, and the terminal sheet part 76 are set to dimensions similar to or approximate to each other.

The facing sheet part 73 is arranged on the opposite side (outboard side) to the short sheet part 71 with the exhaust port 52 interposed therebetween. The intermediate sheet part 74 is folded back to a side (outboard side) apart from the exhaust port 52 with respect to the facing sheet part 73 along a fold line 75 set in the boundary portion with the facing sheet part 73. The intermediate sheet part 74 is overlapped with the facing sheet part 73 on the opposite side to the exhaust port 52. The terminal sheet part 76 is folded back to a side (outboard side) apart from the exhaust port 52 with respect to the intermediate sheet part 74 along the fold line 77 set in the boundary portion with the intermediate sheet part 74. The terminal sheet part 76 is overlapped with the intermediate sheet part 74 on the opposite side to the facing sheet part 73.

The long sheet part 72 is formed in a bellows shape by the folding-back in the two places. When the facing sheet part 73, the intermediate sheet part 74, and the terminal sheet part 76 are combined, the facing sheet part 73 is positioned on the most inboard side, and the terminal sheet part 76 is positioned on the most outboard side. In addition, by overlapping in a folded manner, the length of the bellows-shaped portion of the long sheet part 72 becomes the same as the length of the short sheet part 71.

The short sheet part 71 and the long sheet part 72 are coupled with each other by the coupling parts 78 provided in two places facing each other with the exhaust port 52 interposed therebetween in the direction (width direction) along the surface of the short sheet part 71. Both the coupling parts 78 are connected to the circumferential coupling part 45.

Both side portions of the short sheet part 71 and the long sheet part 72 having the bellows shape in the width direction, more accurately, the outer side portions from both the coupling parts 78 in the width direction are referred to as "coupling margins (margin) 79". Both coupling margins 79 are folded back to the inside of the coupling part 78 in the width direction of the short sheet part 71 and the long sheet part 72, and are arranged between the facing sheet part 73 and the intermediate sheet part 74.

Figure 8:
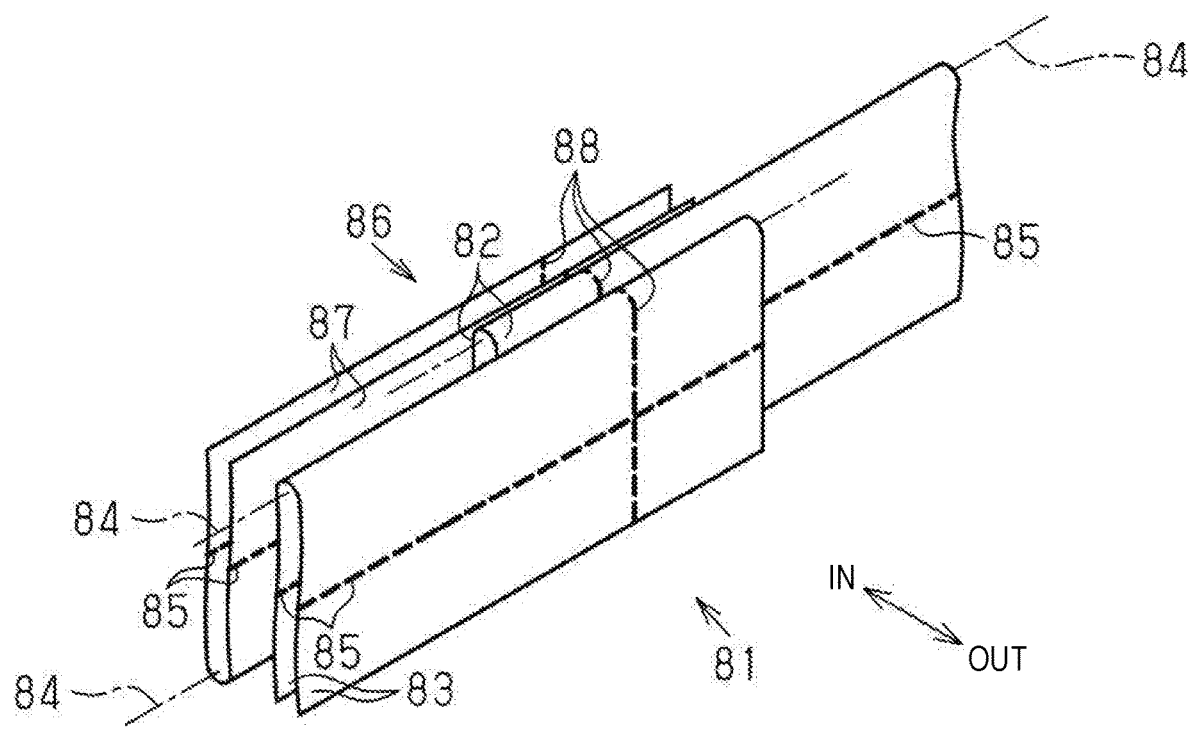
FIG. 8 is a partial perspective view illustrating the main tether and the auxiliary tether according to one embodiment.

As illustrated in FIGS. 4 and 8, the tether is formed by the main tether 81 and an auxiliary tether 86. A portion of the main tether 81 and a portion of the auxiliary tether 86 are formed by a common tether 82. The main tether 81 is formed by the common tether 82 and a main branch tether 83. The auxiliary tether 86 is formed by the common tether 82 and an auxiliary branch tether 87.

The common tether 82 is formed in such manner that the long belt-shaped fabric piece is folded into two along the fold line 84 extending in the length direction of the fabric piece to be overlapped in the vehicle width direction, and the overlapped portions are coupled with each other in the coupling part 85 extending in the length direction. The main branch tether 83 and the auxiliary branch tether 87 have a similar configuration.

The dimension of the common tether 82 in the state of being folded into two in the substantially vertical direction is set to be smaller than the width of any one of the short sheet part 71 and the long sheet part 72. The same is applied to the main branch tether 83 and the auxiliary branch tether 87.

As illustrated in FIGS. 4, 5, and 9, the common tether 82 is arranged to be inclined high toward the front side between the both fabric parts 41 and 42. The front upper end portion of the common tether 82 is sewn together in the front upper end portion of the airbag 40 by the circumferential coupling part 45.

As illustrated in FIGS. 4 and 8, the main branch tether 83 is arranged on the outboard side of the auxiliary branch tether 87. The most portion of the main branch tether 83 and the most portion of the auxiliary branch tether 87 are arranged to be inclined highly toward the front side between the both fabric parts 41 and 42. The front upper end portion of the main branch tether 83 and the front upper end portion of the auxiliary branch tether 87 nip the rear lower end portion of the common tether 82 from both sides in the vehicle width direction.

The front upper end portion of the main branch tether 83, the front upper end portion of the auxiliary branch tether 87, and the rear lower end portion of the common tether 82 are coupled with each other by the coupling part 88 extending in the substantially vertical direction. As illustrated in FIGS. 4 to 6, the rear lower end portion of the main branch tether 83 is exposed from the airbag 40. The exposure portion of the main branch tether 83 is folded back to a side (outboard side) apart from the exhaust port 52 with respect to the facing sheet part 73, and is overlapped from the same side with respect to the terminal sheet part 76. The overlapped portion of the main branch tether 83 is coupled with the end portion of the terminal sheet part 76 on a side apart from the intermediate sheet part 74 by the coupling part 89.

As illustrated in FIGS. 4, 6, and 9, the rear lower end portion of the auxiliary branch tether 87 is exposed from the airbag 40. The exposure portion of the auxiliary branch tether 87 is folded back to a side (inboard side) apart from the exhaust port 52 with respect to the short sheet part 71, and is overlapped with the short sheet part 71 from the same side. The overlapped portion of the auxiliary branch tether 87 is coupled with the tip portion of the short sheet part 71 by the coupling part 91.

As illustrated in FIGS. 5 and 9, both of the coupled place of the main branch tether 83 with the terminal sheet part 76 and the coupled place of the auxiliary branch tether 87 with the short sheet part 71 are central portions in the width direction.

A dimension from the place (circumferential coupling part 45) where the common tether 82 is coupled in the airbag 40 to the place (coupling part 89) where the main branch tether 83 is coupled in the terminal sheet part 76 is set to a "length L1". A dimension from the place (circumferential coupling part 45) where the common tether 82 is coupled with the airbag 40 in the main tether 81 to the place (coupling part 89) where the main branch tether 83 is coupled with the terminal sheet part 76 is set to a "length L2" of the main tether 81. The length L1 is set to be longer than the length L2. The condition is a condition required in order that the main tether 81 is loosened in the initial stage of the deployment and inflation of the airbag 40 and is tensioned in the later stage.

In addition, a dimension from the place (circumferential coupling part 45) where the common tether 82 is coupled in the airbag 40 to the place (coupling part 91) where the auxiliary branch tether 87 is coupled in the short sheet part 71 is set to a "length L3". The dimension from the place (circumferential coupling part 45) where the common tether 82 is coupled with the airbag 40 in the auxiliary tether 86 to the place (coupling part 91) where the auxiliary branch tether 87 is coupled with the short sheet part 71 is set to a "length L4" of the auxiliary tether 86. The length L3 is set to be longer than the length L4. The condition is a condition required in order that the auxiliary tether 86 is loosened in the initial stage of the deployment and inflation of the airbag 40, and is tensioned in the later stage.

The length L2 of the main tether 81 is further set to satisfy following conditions 1 and 2. Condition 1: a length that the main tether 81 is coupled with the terminal sheet part 76 such that when the main tether 81 is loosened in the initial stage of the deployment and inflation of the airbag 40, the intermediate sheet part 74 and the terminal sheet part 76 are positioned on the opposite side (outboard side) to the exhaust port 52 with the facing sheet part 73 interposed therebetween, and the short sheet part 71 and the facing sheet part 73 can be separated from each other (see FIG. 6).

Condition 2: a length that the main tether 81 stretches the terminal sheet part 76 such that when the main tether 81 is tensioned in the later stage of the deployment and inflation of the airbag 40, the facing sheet part 73 and the intermediate sheet part 74 are inflated around the short sheet part 71, and the terminal sheet part 76 is brought into pressure contact with the surface opposite to the exhaust port 52 of the short sheet part 71 (see FIG. 13D).

The length L4 of the auxiliary tether 86 is further set to satisfy following conditions 3 and 4. Condition 3: a length that the auxiliary tether 86 is coupled with the short sheet part 71 such that the short sheet part 71 can be separated from the facing sheet part 73 (see FIG. 6) when the auxiliary tether 86 is loosened in the initial stage of the deployment and inflation of the airbag 40.

In other words, the length is set such that the short sheet part 71 can be regulated not to be inflated further than the terminal sheet part 76 when the deployment and inflation period of the airbag 40 shifts from the initial stage to the later stage and the intermediate sheet part 74 and the terminal sheet part 76 are inverted.

Condition 4: a length that the auxiliary tether 86 stretches the short sheet part 71 such that when the auxiliary tether 86 is tensioned in the later stage of the deployment and inflation of the airbag 40, the surface of the short sheet part 71 on the opposite side to the exhaust port 52 can be brought into pressure contact with the terminal sheet part 76, so as to regulate not to be inflated to the terminal sheet part 76 side (see FIG. 13D).

In order to satisfy the conditions 1 to 4, the common tether 82 is coupled with the airbag 40, the main branch tether 83 is coupled with the terminal sheet part 76, and the auxiliary branch tether 87 is coupled with the short sheet part 71 in a state where the common tether 82, the main tether 81, and the auxiliary tether 86 are tensioned, and the both fabric parts 41 and 42 are bent.

Incidentally, in FIGS. 5, 9, 10, and 15, for the convenience of the illustration, the coupling part where the main tether 81 and the auxiliary tether 86 are coupled with the airbag 40 by the circumferential coupling part 45 is illustrated by a two-dot chain line.

In addition, in FIGS. 6, 7, 11, and 12, the main tether 81 and the auxiliary tether 86, each of which is folded into two, are illustrated by a thick line. The forms of the short sheet part 71 and the long sheet part 72 in FIGS. 6 and 7 are obtained by performing following processes at the time of manufacturing the airbag module ABM.

Figure 11:
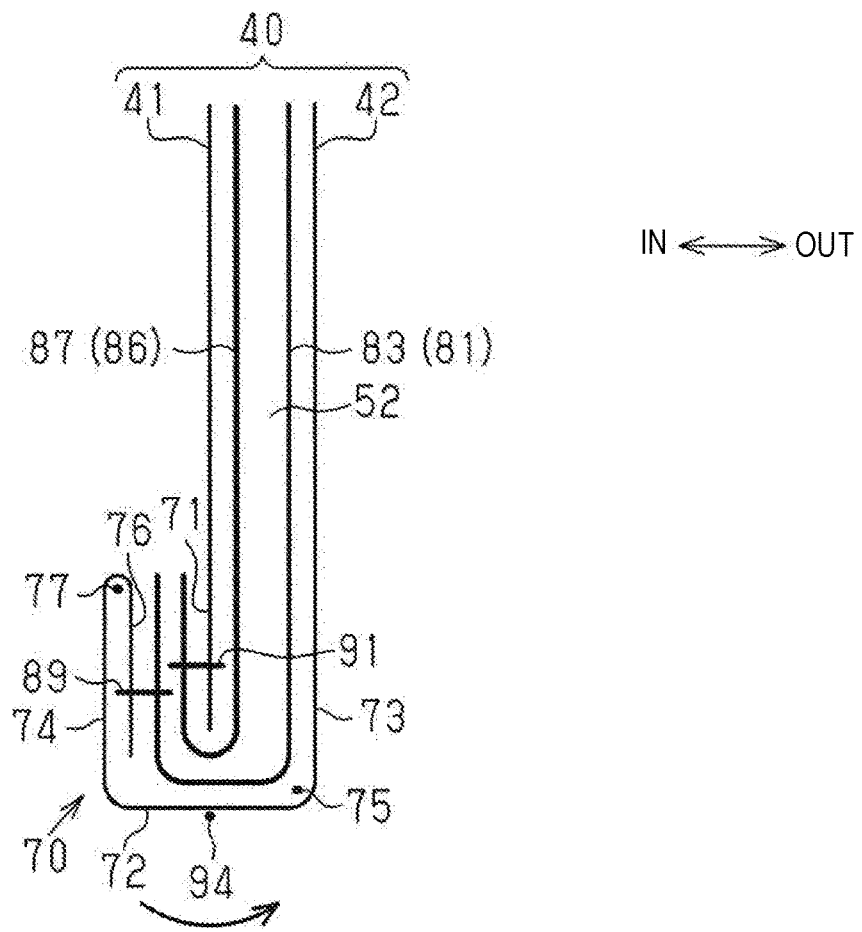
FIG. 11 is a sectional view taken along line 11-11 of FIG. 10.
Figure 12:
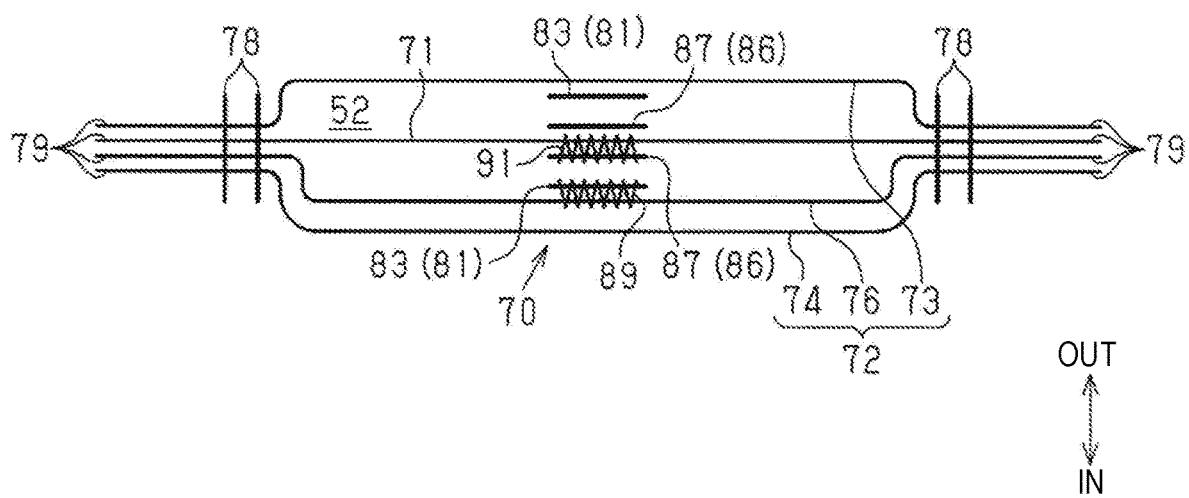
FIG. 12 is a sectional view taken along line 12-12 of FIG. 10.

FIGS. 10 to 12 illustrate the form immediately after the inboard-side fabric part 41 where the auxiliary tether 86 is coupled with the short sheet part 71 is coupled with the outboard-side fabric part 42 where the main tether 81 is coupled with the terminal sheet part 76.

In the long sheet part 72, the intermediate sheet part 74 is folded back along the fold line 75 to a side (inboard side) close to the exhaust port 52 with respect to the facing sheet part 73. The intermediate sheet part 74 is positioned on the opposite side to the facing sheet part 73 with the exhaust port 52 interposed therebetween. The terminal sheet part 76 is folded back along the fold line 77 to a side (outboard side) close to the exhaust port 52 with respect to the intermediate sheet part 74. By the folding-back, the terminal sheet part 76 is positioned between the intermediate sheet part 74, and the facing sheet part 73 and the short sheet part 71.

The exposure portion of the main tether 81 from the airbag 40 is positioned between the terminal sheet part 76 and the short sheet part 71. In other words, the exposure portion of the main tether 81 is positioned on a side (outboard side) close to the exhaust port 52 with respect to the terminal sheet part 76.

The exposure portion of the auxiliary tether 86 from the airbag 40 is positioned between the terminal sheet part 76 and the short sheet part 71. In other words, the exposure portion of the auxiliary tether 86 is positioned on the opposite side (inboard side) to the facing sheet part 73 with the exhaust port 52 interposed therebetween.

The short sheet part 71, the facing sheet part 73 of the long sheet part 72, the terminal sheet part 76, and the intermediate sheet part 74 which are overlapped in the vehicle width direction as above are coupled by the pair of coupling parts 78 which extend in parallel to each other toward the obliquely rear lower side in the rear upper end portion and the front lower end portion thereof.

In this form, both coupling margins 79 are positioned on the outside of both the coupling parts 78 in the width directions of the short sheet part 71 and the long sheet part 72. The intermediate sheet part 74 and the terminal sheet part 76 are positioned on the opposite side to the facing sheet part 73 with the short sheet part 71 interposed therebetween, and close the exhaust port 52.

As indicated by the arrow in FIG. 11, from this state, the intermediate sheet part 74 and the terminal sheet part 76 are inverted (rotated) to a side (a side close to the exhaust port 52, the outboard side) to release the folded-back state with the boundary portion 94 (or the vicinity thereof) between the intermediate sheet part 74 and the facing sheet part 73 set as a fulcrum. In this manner, the shape of FIGS. 6 and 7 is obtained in which both coupling margins 79 are positioned between the facing sheet part 73 and the intermediate sheet part 74, and are folded back to the inside of both the coupling parts 78 in the width direction of the long sheet part 72 and the short sheet part 71.

Incidentally, as illustrated in FIGS. 3A and B, the airbag module ABM having the gas generator 30 and the airbag 40 as main components becomes in a compact stored form when the airbag 40 of the deployment and non-inflation state Illustrated in FIG. 5 and the like is folded along the reinforcing fabrics 53, 54, 61, and 65, the main tether 81, and the auxiliary tether 86. The airbag module ABM in the stored form is stored in the storage part 21 in a state where the flap parts 43 and 44 folded back are positioned on the inboard side. For example, a roll-folding and a bellows-folding are adopted as a method of folding the airbag 40 or the like. The roll-folding is a folding method in which one end portion of the airbag 40 is set as a center, and the other portion is rolled in and folded therearound. The bellows-folding is a folding method in which the airbag 40 is folded back while alternately changing the direction at every certain width.

The bolt 33 which extends from the gas generator 30 to the inboard side to be inserted into the airbag 40 or the like is inserted from the outboard side with respect to the side frame part 16, and a nut 34 is screwed from the inboard side with respect to the same bolt 33. By a fastener formed by combining the bolt 33 and the nut 34, the gas generator 30 is attached together with the airbag 40 or the like in the side frame part 16.

Incidentally, the gas generator 30 may be attached in the side frame part 16 by the fastener having a combination different from the above-described combination of the bolt 33 and the nut 34. In addition, the gas generator 30 may be attached in the side frame part 16 by an attaching unit different from the fastener.

As illustrated in FIG. 1, the side airbag device includes an impact sensor 101 and a control device 102 in addition to the above-described airbag module ABM. The impact sensor 101 is formed of an acceleration sensor and the like, and is provided in a side wall part 11 (see FIG. 2) or the like of the vehicle 10 to detect the impact applied from the side to the same side wall part 11. The control device 102 controls the operation of the gas generator 30 on the basis of the detection signal from the impact sensor 101.

In the vehicle 10, a seat belt device is provided to restrain the occupant P1 sitting on the seat 12 to the seat 12. The seat belt device is not illustrated in FIG. 1 and the like.

Next, the description will be given about the operation and the effect of this embodiment configured as above. When it is not detected by the impact sensor 101 that the impact is applied to the side wall part 11 from the side, the operation signal for the operation is not output from the control device 102 to the gas generator 30, and the inflation gas is not injected from the gas injection part 31a. As illustrated in FIGS. 3A and 3B, the airbag 40 is continuously stored in the storage part 21 in the stored form.

With respect thereto, when an impact of a predetermined value or more, which is applied from the side with respect to the side wall part 11 during the travel or the like of the vehicle 10, is detected by the impact sensor 101, the operation signal for the operation is output with respect to the gas generator 30 from the control device 102 on the basis of the detection signal. In response to the operation signal, the inflation gas is injected from the gas injection part 31a of the inflator 31. The internal pressure of the airbag 40 is raised by the injected inflation gas, and the same airbag 40 starts to be inflated.

The above inflation is performed in a reverse order to the folded order while the folded state is resolved (deployed). The pad 17 of the back rest part 14 is pressed by the airbag 40 which is deployed and inflated as described above, and the same pad 17 is broken in the breakage expected portion 23. The airbag 40 protrudes from the back rest part 14 to the front side through the broken place in a state where a portion thereof remains in the storage part 21.

Thereafter, as indicated by the two-dot chain line in FIGS. 1 and 2, the airbag 40 to which the inflation gas is supplied is deployed and inflated forward between the side wall part 11 and the upper body of the occupant P1 sitting on the seat 12. The upper body of the occupant P1 is pressed by the airbag 40 to be restrained. In addition, when the airbag 40 is interposed between the side wall part 11 and the occupant P1, the impact applied to the occupant P1 is alleviated, and the occupant P1 is protected from the impact. At this time, the reinforcing fabrics 53, 54, and 61 protect the airbag 40 from the heat and the pressure of the inflation gas.

Incidentally, in the initial stage of the deployment and inflation of the airbag 40, the main tether 81 and the auxiliary tether 86 become together in a loosen state. As illustrated in FIG. 6, the intermediate sheet part 74 and the terminal sheet part 76 in the long sheet part 72 are arranged on the opposite side to the exhaust port 52 with the facing sheet part 73 interposed therebetween. The short sheet part 71 and the facing sheet part 73 are separable from each other. The opening area of the exhaust port 52 is large compared to the later stage of the deployment and inflation of the airbag 40. From the exhaust port 52, the more inflation gas than that in the later stage passes through between the short sheet part 71 and the facing sheet part 73 which are separated, and is exhausted to the outer portion of the airbag 40. By the exhaustion, the internal pressure of the airbag 40 is lowered compared to the later stage of the deployment and inflation.

Figure 14:
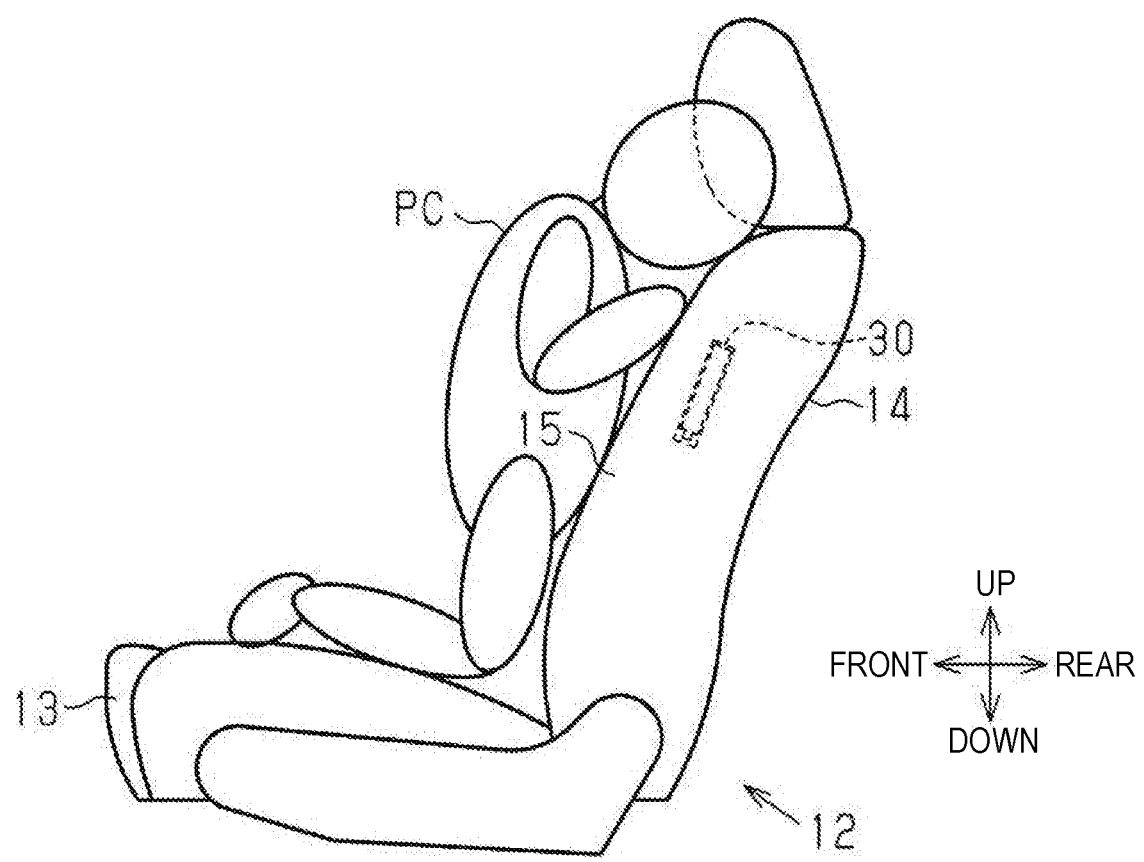
FIG. 14 is a side view illustrating the seat provided with the side airbag device in one embodiment together with a child.

Accordingly, even when a child PC is near the front side of the storage part 21, and the airbag 40 interferes (abuts) with the child PC in the initial stage of the deployment and inflation, the same airbag 40 does not strongly press the child PC. A situation in which the child PC leans on the outboard side part of the back rest part 14 in a posture of facing rearward as illustrated in FIG. 14 is exemplified as the situation in which the child PC is near the front side of the storage part. The airbag 40 continuously exhausts the inflation gas from the exhaust port 52. The side airbag device completes the operation before the airbag 40 is completely deployed and inflated.

Herein, as illustrated in FIG. 1, the exhaust port 52 in the airbag 40 is open toward a direction along the wall surface of the side wall part 11. For this reason, the inflation gas G1 exhausted from the exhaust port 52 flows in a direction along the wall surface of the side wall part 11. The exhaustion of the inflation gas G1 from the exhaust port 52 is hardly inhibited by the side wall part 11 unlike a case where the exhaust port is open facing the side wall part, and the side wall part is positioned on the front side in the exhaust direction of the inflation gas from the same exhaust port (JP-A-2001-114065 corresponds thereto). In the initial stage of the deployment and inflation of the airbag 40, a performance is exhibited which lowers the internal pressure of the airbag 40 by exhausting the inflation gas G1 from the exhaust port 52. In this manner, the exhaust performance of the inflation gas G1 in the initial stage of the deployment and inflation of the airbag 40 is improved.

Particularly, in this embodiment, the exhaust port 52 is open toward the obliquely rear lower side in a direction along the wall surface of the side wall part 11. For this reason, the inflation gas G1 is exhausted toward the obliquely rear lower side from the exhaust port 52. The exhausting direction is a direction to be apart from the child PC. For this reason, even when the airbag 40 interferes (abuts) with the child PC in the initial stage of the deployment and inflation of the airbag, the exhaustion of the inflation gas G1 from the exhaust port 52 is hardly inhibited by the child PC. In the initial stage of the deployment and inflation of the airbag 40, the performance is properly exhibited which lowers the internal pressure of the airbag 40 by exhausting the inflation gas G1 from the exhaust port 52.

In addition, when the airbag 40 starts to be deployed and inflated, the exhaust port 52 is open on the rear side from the front end edge of the side support part 15, and the inflation gas G1 is exhausted from the exhaust port 52. On the other hand, the child PC is positioned on the front side from the front end edge of the side support part 15.

Accordingly, the inflation gas starts to be exhausted from the exhaust port 52 before the airbag 40 interferes (abuts) with the child PC. The airbag 40 of which the internal pressure is lowered by the exhaustion interferes (abuts) with the child PC, and thus it can be further suppressed that the child PC is pressed strongly.

On the other hand, in a case where the child PC is not on the front side of the storage part 21, after the state (a state where the opening area of the exhaust port 52 is enlarged) of the initial stage of the deployment and inflation of the airbag 40, the opening area of the exhaust port 52 is reduced by the opening varying mechanism 70 compared to the initial stage.

Figure 13A:
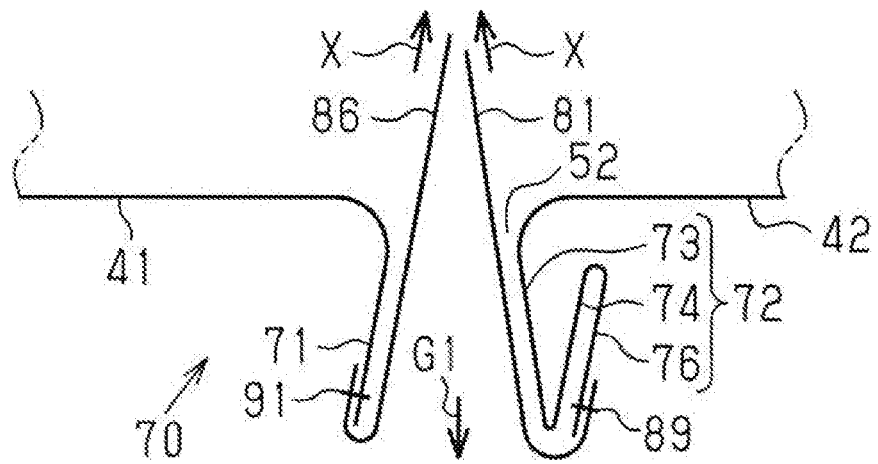
FIGS. 13A to 13D are views for explaining an operation of an opening varying mechanism in one embodiment.

That is, in accordance with the deployment and inflation, in FIG. 13A, the main tether 81 and the auxiliary tether 86 are stretched in a direction indicated by an arrow X to be in a tensioned state. In the terminal sheet part 76, the long sheet part 72 is stretched to the exhaust port 52 side by the main tether 81. The stretched terminal sheet part 76 enters into a space between the short sheet part 71 and the facing sheet part 73.

However, the short sheet part 71 and the long sheet part 72 are coupled in the places facing each other with the exhaust port 52 interposed therebetween in the direction (width direction) along the surface thereof (see FIG. 7). Thus, a portion of the inflation gas G1 exhausted through the exhaust port 52 enters into a space between the intermediate sheet part 74 and the terminal sheet part 76.

The intermediate sheet part 74 between the facing sheet part 73 and the terminal sheet part 76 receives the pressure of the inflation gas G1 exhausted from between the short sheet part 71 and the facing sheet part 73.

Figure 13B:
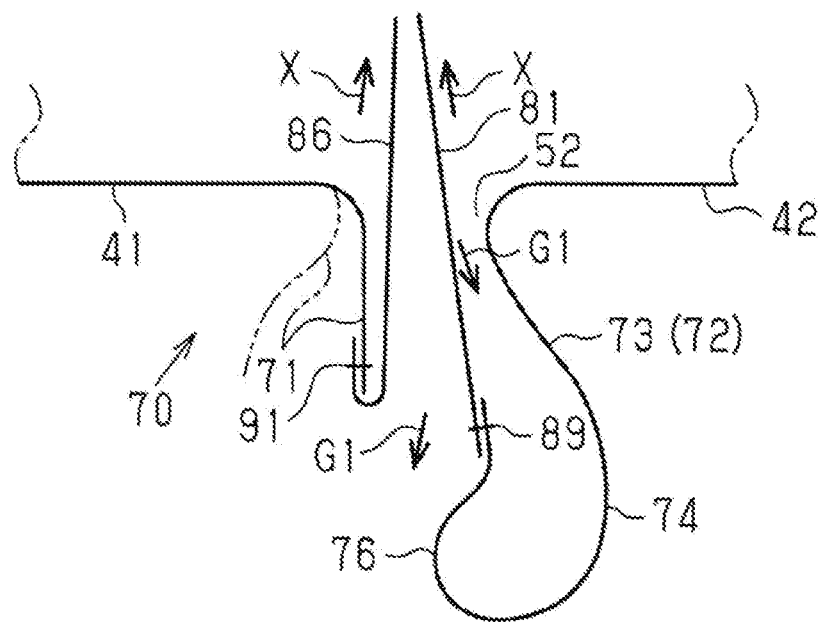
Figure 13C:
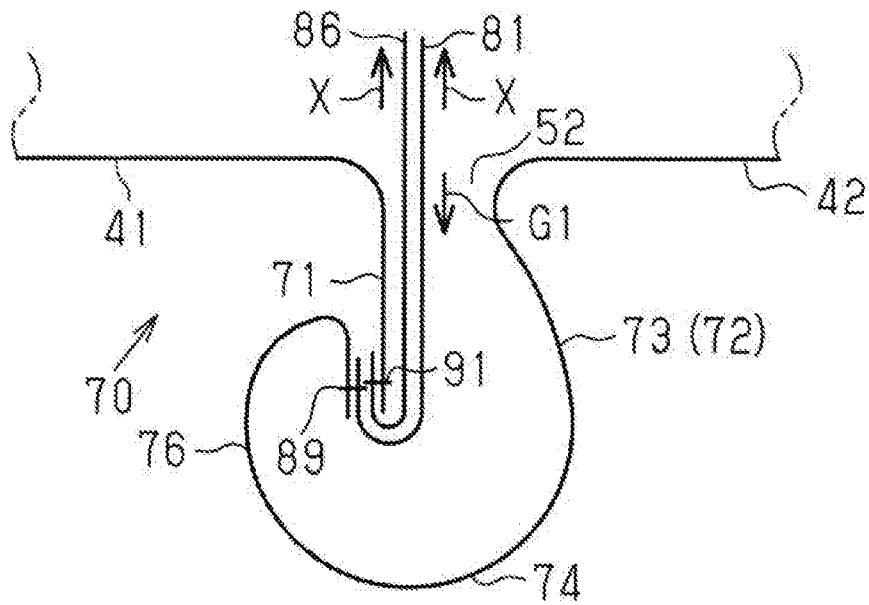
Figure 13D:
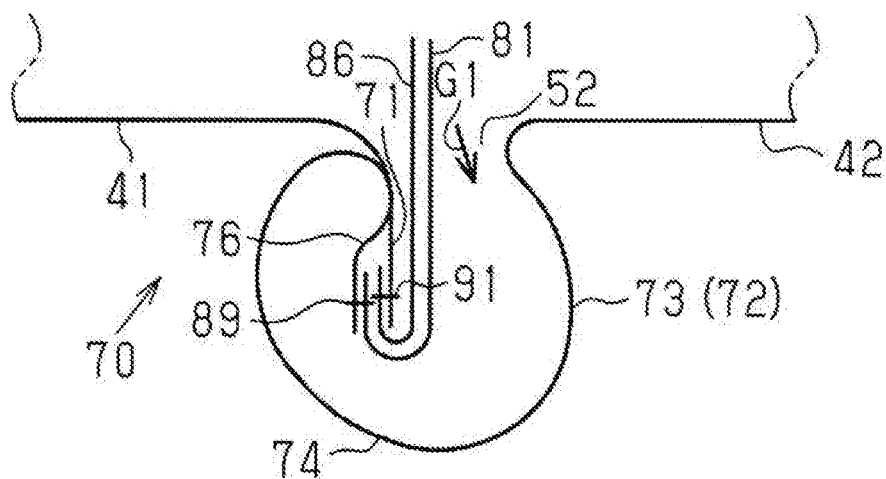

For this reason, as illustrated in FIGS. 13B to 13D, in order to return to the form of FIGS. 11 and 12, the intermediate sheet part 74 and the terminal sheet part 76 are rotated about the vicinity of the boundary portion of the facing sheet part 73 and the intermediate sheet part 74, and are turned (inverted) to the opposite side to the exhaust port 52 of the short sheet part 71.

In addition, at this time, the auxiliary tether 86 stretches the short sheet part 71 so as to regulate the short sheet part 71 not to be inflated in a direction in which the tip portion of the short sheet part 71 is apart from the exhaust port 52 as indicated by the two-dot chain line in FIG. 13B. For this reason, it is suppressed that the terminal sheet part 76 enters a space between the short sheet part 71 and the facing sheet part 73, and the intermediate sheet part 74 and the terminal sheet part 76 can be properly turned (inverted) to the opposite side to the exhaust port 52 of the short sheet part 71.

By the inversion, the intermediate sheet part 74 and the terminal sheet part 76 ride over the tip portion of the short sheet part 71, and are brought close to the inboard-side fabric part 41. In the form in which the intermediate sheet part 74 and the terminal sheet part 76 are inverted as described above, as illustrated in FIG. 13D, the facing sheet part 73 is positioned on the opposite side to the short sheet part 71 with the exhaust port 52 interposed therebetween. The intermediate sheet part 74 is positioned on the downstream side between the short sheet part 71 and the facing sheet part 73 in the exhaust direction. The terminal sheet part 76 is positioned on the opposite side to the exhaust port 52 of the short sheet part 71. In this manner, the exhaust port 52 becomes in the closed state.

The terminal sheet part 76 is brought into pressure contact with the opposite surface to the exhaust port 52 in the short sheet part 71. By the pressure contact, a gap between the short sheet part 71 and the terminal sheet part 76 becomes small, and the inflation gas G1 is hardly exhausted to the outer portion of the airbag 40.

As a result, the internal pressure of the airbag 40 is raised, and the deployment and inflation are completed quickly. The occupant P1 sitting on the seat 12 in a normal posture is restrained by the airbag 40 and is protected from the impact.

In this embodiment, following effects are obtained in addition to the above description.

In the side airbag device described in JP-A-2001-114065, from the initial stage of the deployment and inflation of the airbag, the sliding member is positioned to be close to the exhaust port of the same airbag, so as to inhibit the exhaustion of the inflation gas from the exhaust port, which is a matter of concern.

At this point, in this embodiment, an additional member which inhibits the exhaustion is not arranged near the exhaust port 52.

Incidentally, the main tether 81 and the auxiliary tether 86 are formed by using a long belt-shaped fabric piece. Further, the fabric piece is folded into two, and has a belt shape having a small width. For this reason, an extent that the main tether 81 and the auxiliary tether 86 inhibit the exhaustion is negligibly smaller than an extent that the sliding member in JP-A-2001-114065 inhibits the exhaustion.

For this reason, the more inflation gas than in JP-A-2001-114065 can be exhausted from the exhaust port 52 to the outer portion of the airbag 40.

All the short sheet part 71, the long sheet part 72, the main tether 81, and the auxiliary tether 86 forming the opening varying mechanism 70 are formed of a sheet material having a flexibility. For this reason, those members can be easily folded together with the airbag 40.

As illustrated in FIG. 8, a portion of the main tether 81 and a portion of the auxiliary tether 86 are formed by the common tether 82 which is a common member. For this reason, the used fabric piece can be reduced compared to a case where the main tether 81 and the auxiliary tether 86 are formed by separate members.

As illustrated in FIG. 8, the common tether 82 is formed in such a manner that a long belt-shaped fabric piece is folded into two along the fold line 84 to be overlapped in the vehicle width direction, and the overlapped portion is coupled with each other by the coupling part 85. For this reason, the strength of the common tether 82 can be improved.

The main branch tether 83 and the auxiliary branch tether 87 are also formed similarly to the common tether 82, and thus the similar effect can be obtained. Incidentally, the embodiment can be implemented as a modification which is modified as below.

In the pair of flap parts 43 and 44 in FIG. 3B, the flap part 43 on the inboard side may be not provided. Even in the case, the insertion port 46 can be closed when the outboard-side flap part 44 is folded back to the inboard side and is engaged with the bolt 33.

As in the embodiment, when the insertion port 46 for inserting the gas generator 30 in the airbag 40 is provided separately from the exhaust port 52, a seal structure is necessary which suppresses that the inflation gas from the insertion port 46 leaks out to the outer portion of the airbag 40 after the gas generator 30 passes through the insertion port 46 to be inserted into the airbag 40. In the embodiment, the pair of flap parts 43 and 44 are provided, and a seal structure is adopted in which the insertion port 46 is closed when the flap parts are folded back to the inboard side and are engaged with the bolt 33.

On the other hand, in the embodiment, in a case where the exhaust port 52 has such a size (diameter) that the gas generator 30 can pass therethrough and the exhaust port 52 also serves as the insertion port 46. In this manner, the gas generator 30 can pass through the exhaust port 52 to be inserted into the airbag 40, and thus the insertion port 46 in the embodiment may not be provided.

The opening area of the exhaust port 52 is adjusted by the opening varying mechanism 70 as described above. For this reason, it is not necessary to provide a seal structure which suppresses that the inflation gas from the exhaust port 52 serving as the insertion port 46 leaks out to the outer portion of the airbag 40.

Figure 15:
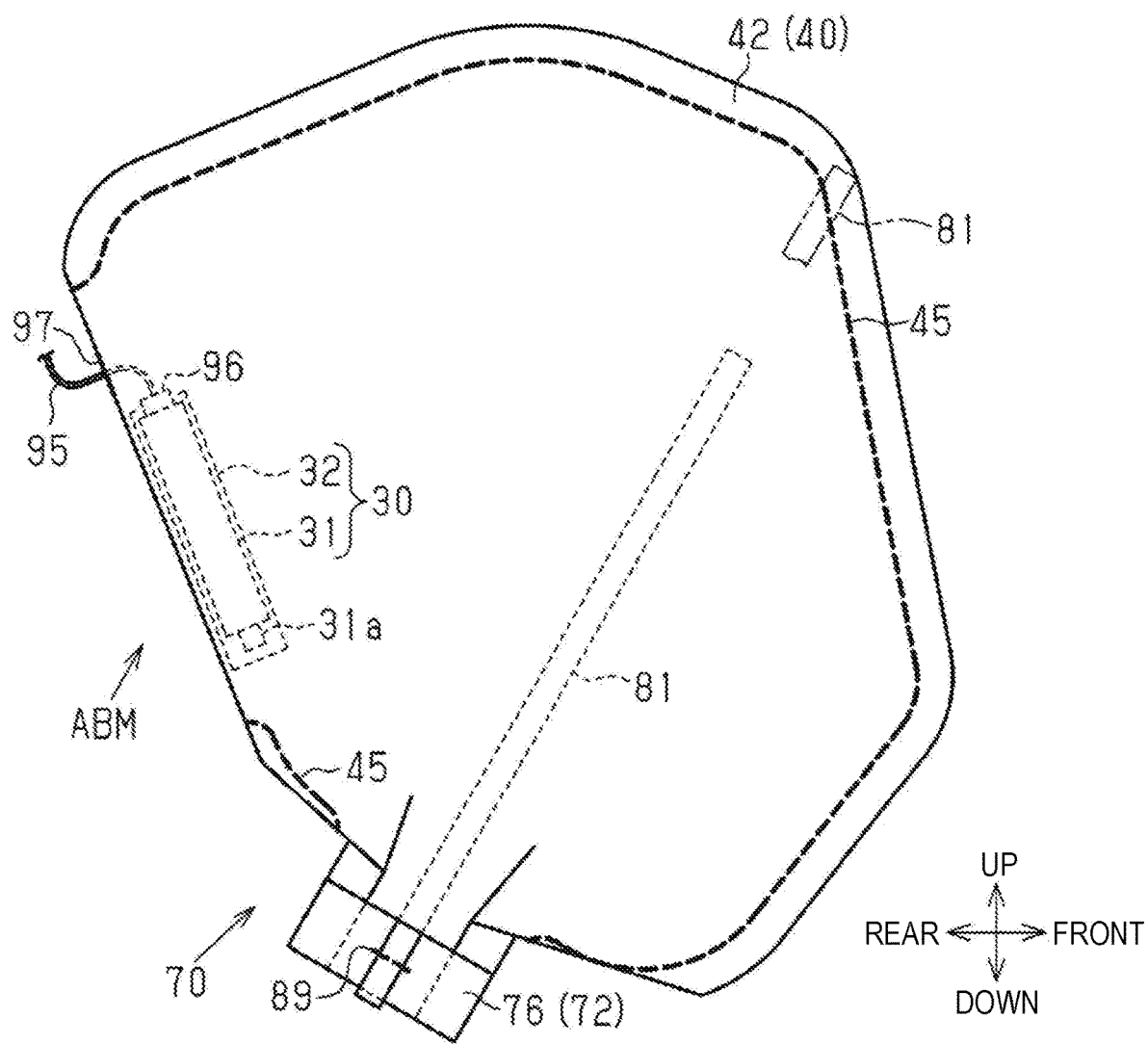
FIG. 15 is a side view illustrating an airbag module of a modification when viewed from the outboard side.

However, as illustrated in FIG. 15, strictly, a hole 97 (illustrated by the thick line) for communicating the inner portion and the outer portion of the airbag 40 and passing through the connector 96 connected in the inflator 31 and the harness 95 connected in the connector 96 is necessary in the airbag 40. However, the hole 97 is smaller than the insertion port 46 in the embodiment. For this reason, an amount of the leaking inflation gas from the hole 97 is negligibly small.

Such a change is applied, for example, to a case where the airbag 40 is formed of one fabric piece.

Almost the entire airbag 40 may be inflated as in the embodiment, but a non-inflation part to which the inflation gas is not supplied so that the non-inflation part is not inflated may be partially provided in the airbag.

In a case where the short sheet part 71 is not inflated or hardly inflated so that the tip portion of the short sheet part 71 is apart from the exhaust port 52 by a relation of a position or the like of the exhaust port 52 in the later stage of the deployment and inflation of the airbag 40, the auxiliary tether 86 may not be provided.

The coupled place of the front upper end portion of the common tether 82 with respect to the airbag 40 may be changed to the place different from in the embodiment.

The front upper end portion of the common tether 82 may be coupled with any one of the fabric parts 41 and 42.

As illustrated in FIG. 15, the common tether 82 may not be provided, and the main tether 81 and the auxiliary tether 86 may be formed by separate members. In the case, the coupled place of the front upper end portion of the main tether 81 with respect to the airbag 40 and the coupled place of the front upper end portion of the auxiliary tether 86 with respect to the airbag 40 may be similar or different.

As in the embodiment, in a case where the main tether 81 and the auxiliary tether 86 are used in combination, the length of at least one tether may be changed. In this manner, the adjusting method of the opening area of the exhaust port 52 is changed to adjust an exhaustion suppressing amount of the inflation gas.

As long as the exhaust port 52 is open toward the direction along the wall surface of the side wall part 11, the position of the exhaust port 52 in the airbag 40 may be changed to the place different from in the embodiment (rear lower end portion).

For example, the exhaust port 52 may be provided to be open forward in the front end portion of the airbag 40. In addition, the exhaust port 52 may be provided to be open toward the rear side in the rear end portion of the airbag 40.

In addition, the exhaust port 52 may be open toward the upper side or the lower side, further the obliquely front upper side, the obliquely front lower side, the obliquely rear upper side, or the like.

The exhaust ports 52 may be provided in the plurality of places of the airbag 40, and the opening varying mechanism 70 may be provided in each of the exhaust ports 52.

The short sheet part 71 may be formed of the fabric piece separate from the inboard-side fabric part 41. Similarly, the long sheet part 72 may be formed of the fabric piece separate from the outboard-side fabric part 42. In these case, the short sheet part 71 is coupled with the inboard-side fabric part 41, and the long sheet part 72 is coupled with the outboard-side fabric part 42 in the facing sheet part 73.

Conversely to the embodiment, the short sheet part 71 may be provided in the outboard-side fabric part 42, and the long sheet part 72 may be provided in the inboard-side fabric part 41.

At least one of the reinforcing fabrics 53, 54, 61, and 65 may not be provided.

In addition, the reinforcing fabric may be used more than in the embodiment. Storage part 21

Instead of the back rest part 14 of the seat 12, the storage part 21 may be provided in the side wall part 11, and the airbag module ABM may be embedded therein.

The side airbag device is applicable to a rear seat as well as the front seat. In this case, the side wall part 11 corresponding to the rear seat is a rear portion of a side door (rear door), a C pillar, a front portion of a tire house, a rear quarter, and the like.

The airbag module ABM may be attached in a garnish arranged between the side wall part 11 and the back rest part. For example, a case in which the airbag module ABM is arranged in the inner portion may be attached in the garnish. The breakage expected portion (tear line) to be broken by the airbag 40 may be formed in the garnish.

In the side airbag device for the rear seat, the garnish is pressed to the front side by the deployed and inflated airbag 40, and is broken in the breakage expected portion having a low strength. The airbag 40 passes through the broken place in a state where a portion of the airbag remains in the case, and protrudes from the garnish to the front side. Thereafter, the airbag 40 to which the inflation gas is supplied is deployed and inflated forward a space between the side wall part 11 and the upper body of the occupant P1 sitting on the seat (rear seat). The upper body of the occupant P1 is restrained by the airbag 40. The impact which is transmitted from the side through the side wall part 11 is alleviated by the airbag 40, so that the upper body is protected.

The side airbag device is applicable to a side airbag device which protects an area, which is different from in the embodiment, of the upper body of the occupant P1.

The vehicle to which the side airbag device is applied includes various industrial vehicles as well as a private vehicle.

What is claimed is:

1. A side airbag device comprising:
an airbag which is stored in a storage part provided on a side of an occupant sitting on a seat of a vehicle in a normal posture, and is deployed and inflated forward between the occupant and a side wall part by an inflation gas supplied from a gas generator in response to an impact applied from a side to the side wall part of the vehicle;
an exhaust port configured to exhaust an inflation gas, the exhaust port being provided with the airbag and open toward a direction along a wall surface of the side wall part; and
an opening varying mechanism configured to reduce an opening area of the exhaust port in a later stage of deployment and inflation of the airbag compared to an initial stage.

2. The side airbag device according to claim 1, wherein:
the opening varying mechanism includes: a pair of sheet parts which extend from the airbag and oppositely disposed by interposing the exhaust port; and a long belt-shaped tether in which a main portion is arranged in the airbag;
one sheet part is formed by a belt-shaped short sheet part, and the other sheet part is formed by a long sheet part which extends from the airbag further than the short sheet part;
the long sheet part includes: a belt-shaped facing sheet part which is arranged on an opposite side to the short sheet part across the exhaust port; a belt-shaped intermediate sheet part which is overlapped on an opposite side to the exhaust port with respect to the facing sheet part; and a belt-shaped terminal sheet part which is overlapped on an opposite side to the facing sheet part with respect to the intermediate sheet part;
the short sheet part and the long sheet part are coupled in places facing each other by interposing the exhaust port in a direction along a surface of the short sheet part;
one end portion of the tether is coupled with the airbag, and the other end portion is arranged in an outer portion of the airbag through the exhaust port to be coupled with an end portion of the terminal sheet part on a side apart from the intermediate sheet part; and
in the opening varying mechanism, the tether is loosened in the initial stage of the deployment and inflation of the airbag so that the short sheet part and the facing sheet part are separable from each other, the tether is tensioned in the later stage so that the long sheet part in the terminal sheet part is stretched to the exhaust port side, and the intermediate sheet part and the terminal sheet part turn to an opposite side to the exhaust port by interposing the short sheet part when the inflation gas exhausted through the exhaust port enters into a space between the intermediate sheet part and the terminal sheet part.

3. The side airbag device according to claim 2, wherein a length of the tether is set to be a length that the tether stretches the terminal sheet part such that, when the same tether is tensioned in the later stage of the deployment and inflation of the airbag, the terminal sheet part is capable of being brought into pressure contact with a surface opposite to the exhaust port in the short sheet part.

4. The side airbag device according to claim 3, wherein in a case that the tether is set as a main tether:
   the opening varying mechanism further includes an auxiliary tether having a long belt shape of which a main portion is arranged in the airbag;
   one end portion of the auxiliary tether is coupled with the airbag, and the other end portion is arranged in an outer portion of the airbag through the exhaust port to be coupled with a tip portion of the short sheet part; and
   a length of the auxiliary tether is set to be a length that the auxiliary tether stretches the short sheet part such that, when the same auxiliary tether is tensioned in the later stage of the deployment and inflation of the airbag, a surface opposite to the exhaust port in the short sheet part is capable of being brought into pressure contact with the terminal sheet part, and the short sheet part is regulated not to be inflated to the terminal sheet part side.

5. The side airbag device according to claim 1, wherein the exhaust port is open toward an obliquely rear lower side.

6. The side airbag device according to claim 5, wherein the exhaust port is arranged on a rear side from a front end edge of a side support part forming an outboard side part in a back rest part of the seat.

7. The side airbag device according to claim 1, wherein the exhaust port also serves as an insertion port for inserting the gas generator in the airbag.

* * * * *